United States Patent
Leung et al.

(10) Patent No.: US 7,353,438 B2
(45) Date of Patent: Apr. 1, 2008

(54) TRANSPARENT ERROR CORRECTING MEMORY

(75) Inventors: Wingyu Leung, Cupertino, CA (US); Kit Sang Tam, Belmont, CA (US); Mikolaj Tworek, Kanata (CA); Fu-Chieh Hsu, Saratoga, CA (US)

(73) Assignee: MoSys, Inc., Sunnyvale, CA (US)

( * ) Notice: Subject to any disclaimer, the term of this patent is extended or adjusted under 35 U.S.C. 154(b) by 178 days.

(21) Appl. No.: 10/645,861

(22) Filed: Aug. 20, 2003

(65) Prior Publication Data
US 2005/0044467 A1 Feb. 24, 2005

Related U.S. Application Data

(63) Continuation-in-part of application No. 10/003,602, filed on Nov. 14, 2001.

(51) Int. Cl.
*G11C 29/00* (2006.01)
(52) U.S. Cl. .................................... 714/720
(58) Field of Classification Search ............. 714/703, 714/718, 719, 720
See application file for complete search history.

(56) References Cited

U.S. PATENT DOCUMENTS

| | | | |
|---|---|---|---|
| 3,576,982 A * | 5/1971 | Duke | 714/6 |
| 3,814,921 A | 6/1974 | Nibby et al. | |
| 3,969,706 A | 7/1976 | Proebsting et al. | |
| 4,037,091 A * | 7/1977 | Beuscher | 714/758 |
| 4,045,783 A | 8/1977 | Harland | |
| 4,075,466 A * | 2/1978 | Jonsson et al. | 714/718 |
| 4,317,201 A | 2/1982 | Sedalis | |
| 4,345,328 A | 8/1982 | White | |
| 4,380,812 A | 4/1983 | Ziegler, II et al. | |
| 4,389,714 A | 6/1983 | Nakao | |
| 4,479,214 A * | 10/1984 | Ryan | 714/702 |
| 4,561,095 A * | 12/1985 | Khan | 714/767 |
| 4,604,751 A * | 8/1986 | Aichelmann et al. | 714/723 |

(Continued)

FOREIGN PATENT DOCUMENTS

JP 55055499 4/1980

OTHER PUBLICATIONS

"Error detection and correction with the IDT49C466" by Anupama Hegde, Dec. 18, 1994, No. 10, pp. 613-620.

(Continued)

*Primary Examiner*—Stephen M. Baker
(74) *Attorney, Agent, or Firm*—Bever, Hoffman & Harms, LLP; E. Eric Hoffman

(57) ABSTRACT

A memory system with transparent error correction circuitry provides full stuck-at fault coverage for both test data patterns and the corresponding error correction code (ECC) values. The memory system includes a semiconductor memory having a memory array, a memory interface and an error detection/correction unit. The memory array is configured to store test data patterns and corresponding error correction code (ECC) values. The memory interface is configured such that the ECC values are not directly accessible. The error detection/correction unit is configured to correct single-bit errors in the test data patterns and corresponding ECC values. A set of test data patterns associated with the semiconductor memory is selected such that any multiple-bit error in a test data pattern and the corresponding ECC value causes the error detection/correction unit to provide an output data pattern having an error, thereby rendering multiple-bit faults 100% detectable.

22 Claims, 11 Drawing Sheets

U.S. PATENT DOCUMENTS

| | | |
|---|---|---|
| 4,694,454 A | 9/1987 | Matsuura |
| 4,706,248 A * | 11/1987 | Masaki ................ 714/703 |
| 4,726,021 A * | 2/1988 | Horiguchi et al. .......... 714/773 |
| 4,740,968 A * | 4/1988 | Aichelmann, Jr. .......... 714/703 |
| 4,768,197 A | 8/1988 | Petolino et al. |
| 4,782,487 A * | 11/1988 | Smelser ................ 714/723 |
| 4,794,597 A * | 12/1988 | Ooba et al. ................ 714/703 |
| 4,839,868 A | 6/1989 | Sato et al. |
| 4,884,271 A | 11/1989 | Concha et al. |
| 4,933,904 A | 6/1990 | Stewart et al. |
| 4,939,694 A * | 7/1990 | Eaton et al. ................ 365/200 |
| 5,003,542 A | 3/1991 | Mashiko et al. |
| 5,008,886 A | 4/1991 | Chinnaswamy et al. |
| 5,151,906 A * | 9/1992 | Sawada ................ 714/805 |
| 5,177,743 A * | 1/1993 | Shinoda et al. ............. 714/702 |
| 5,233,616 A | 8/1993 | Callander |
| 5,235,693 A | 8/1993 | Chinnaswamy et al. |
| 5,241,503 A | 8/1993 | Cheng |
| 5,274,646 A * | 12/1993 | Brey et al. ................ 714/758 |
| 5,289,584 A | 2/1994 | Thome et al. |
| 5,369,651 A | 11/1994 | Marisetty |
| 5,402,389 A | 3/1995 | Flannagan et al. |
| 5,430,742 A | 7/1995 | Jeddeloh et al. |
| 5,434,868 A * | 7/1995 | Aichelmann et al. ....... 714/718 |
| 5,469,558 A | 11/1995 | Lieberman et al. |
| 5,502,835 A | 3/1996 | Le et al. |
| 5,513,148 A | 4/1996 | Zagar |
| 5,519,839 A | 5/1996 | Culley et al. |
| 5,519,847 A | 5/1996 | Fandrich et al. |
| 5,524,220 A | 6/1996 | Verma et al. |
| 5,533,194 A * | 7/1996 | Albin et al. ................ 714/42 |
| 5,535,226 A * | 7/1996 | Drake et al. ................ 714/773 |
| 5,579,267 A | 11/1996 | Koshikawa |
| 5,586,282 A | 12/1996 | Iino et al. |
| 5,592,435 A | 1/1997 | Mills et al. |
| 5,615,169 A | 3/1997 | Leung |
| 5,638,385 A | 6/1997 | Fitfield et al. |
| 5,671,187 A | 9/1997 | Childers et al. |
| 5,687,353 A | 11/1997 | Chen et al. |
| 5,708,624 A | 1/1998 | Leung |
| 5,778,237 A | 7/1998 | Yamamoto et al. |
| 5,829,026 A | 10/1998 | Leung et al. |
| 5,933,436 A * | 8/1999 | Tanzawa et al. ............. 714/762 |
| 5,961,655 A * | 10/1999 | Johnson et al. ................ 714/48 |
| 6,020,773 A | 2/2000 | Kan et al. |
| 6,052,011 A | 4/2000 | Dasgupta |
| 6,052,816 A * | 4/2000 | Yoshinogawa ............. 714/766 |
| 6,065,146 A | 5/2000 | Bosshart |
| 6,101,614 A | 8/2000 | Gonzales et al. |
| 6,147,535 A | 11/2000 | Leung |
| 6,374,381 B1 | 4/2002 | Moriya |
| 6,549,460 B2 * | 4/2003 | Nozoe et al. .......... 365/185.09 |
| 6,563,745 B1 * | 5/2003 | Ilkbahar ................ 365/189.07 |
| 6,697,992 B2 * | 2/2004 | Ito et al. ..................... 714/763 |
| 6,701,480 B1 | 3/2004 | Karpuszka et al. |
| 6,738,883 B2 | 5/2004 | March et al. |
| 6,781,898 B2 * | 8/2004 | Kim et al. .................. 365/200 |
| 6,799,287 B1 * | 9/2004 | Sharma et al. .............. 714/703 |
| 6,854,059 B2 | 2/2005 | Gardner |
| 7,064,993 B2 | 6/2006 | Gyohten et al. |
| 7,099,216 B2 | 8/2006 | Luk et al. |
| 2002/0029365 A1 | 3/2002 | Sato et al. |
| 2004/0039883 A1 | 2/2004 | LaBerge et al. |
| 2004/0044943 A1 | 3/2004 | Jacquet et al. |
| 2004/0064646 A1 | 4/2004 | Emerson et al. |
| 2004/0172504 A1 | 9/2004 | Balazich et al. |
| 2004/0213064 A1 | 10/2004 | Gyohten et al. |
| 2005/0185492 A1 | 8/2005 | Harrand |
| 2006/0034132 A1 | 2/2006 | Jain |
| 2006/0080589 A1 | 4/2006 | Holm et al. |
| 2006/0156196 A1 | 7/2006 | Takahashi et al. |
| 2006/0158950 A1 | 7/2006 | Klein |
| 2006/0200723 A1 | 9/2006 | Carnevale et al. |
| 2006/0200728 A1 | 9/2006 | Nagai et al. |

OTHER PUBLICATIONS

"Error Correction Circuitry for Dynamic Random Access Memories", IBM Technical Disclosure Bulletin, vol. 36, No. 08, Aug. 1993, pp. 681-682.

"Cost Analysis of On Chip Error Control Coding . . . ", by Najmi Jarwala et al., 1987 IEEE, pp. 278-283.

"16-Bit CMOS Error Detection And Correction Unit", IDT, Inc., Apr. 1990, pp. 1-19.

"A Class of Optimal Minimum Odd-weight-column SEC-DED Codes", by H.Y. Hsiao, Jul. 1970, pp. 395-401.

Bondurant, D. "15nsec Enhanced DRAM Upgrades System Performance in 72-Pin SIMM Socket", Silicon Valley Personal Computer Design Conference Proceedings, Date Unknown, pp. 81-86.

Dosaka et al. "A 100-Mhz-4-Mb Cache DRAM with Fast Copy-Back Scheme", IEEE Journal of Solid-State Circuits, vol. 27, No. 11, Nov. 1992, pp. 1534-1539.

Sunaga et al. "A Full Bit Prefetch Architecture for Synchronous DRAMS's", IEEE Journal of Solid-State Circuits, vol. 30, No. 9, Sep. 1995, pp. 998-1005.

Pentium Processor 3.3V Pipelined BSRAM Specification, Ver. 2.0, Intel Corp., May 25, 1995, pp. 1-44.

* cited by examiner

| BIT | C0 | C1 | C2 | C3 | C4 | C5 | C6 | C7 |
|---|---|---|---|---|---|---|---|---|
| 63 | 0 | 0 | 0 | 0 | 0 | 0 | 0 | 0 |
| 62 | 0 | 0 | 0 | 0 | 0 | 0 | 0 | 0 |
| 61 | 0 | 0 | 0 | 0 | 0 | 0 | 0 | 0 |
| 60 | 0 | 0 | 0 | 0 | 0 | 0 | 0 | 0 |
| 59 | 0 | 0 | 0 | 0 | 0 | 0 | 0 | 0 |
| 58 | 0 | 0 | 0 | 0 | 0 | 0 | 0 | 0 |
| 57 | 0 | 0 | 0 | 0 | 0 | 0 | 0 | 0 |
| 56 | 0 | 0 | 0 | 0 | 0 | 0 | 0 | 0 |
| 55 | 0 | 0 | 0 | 0 | 0 | 0 | 0 | 0 |
| 54 | 0 | 0 | 0 | 0 | 0 | 0 | 0 | 0 |
| 53 | 0 | 0 | 0 | 0 | 0 | 0 | 0 | 0 |
| 52 | 0 | 0 | 0 | 0 | 0 | 0 | 0 | 0 |
| 51 | 0 | 0 | 0 | 0 | 0 | 0 | 0 | 0 |
| 50 | 0 | 0 | 0 | 0 | 0 | 0 | 0 | 0 |
| 49 | 0 | 0 | 0 | 0 | 0 | 0 | 0 | 0 |
| 48 | 0 | 0 | 0 | 0 | 0 | 0 | 0 | 0 |
| 47 | 0 | 0 | 0 | 0 | 0 | 0 | 0 | 0 |
| 46 | 0 | 0 | 0 | 0 | 0 | 0 | 0 | 0 |
| 45 | 0 | 0 | 0 | 0 | 0 | 0 | 0 | 0 |
| 44 | 0 | 0 | 0 | 0 | 0 | 0 | 0 | 0 |
| 43 | 0 | 0 | 0 | 0 | 0 | 0 | 0 | 0 |
| 42 | 0 | 0 | 0 | 0 | 0 | 0 | 0 | 0 |
| 41 | 0 | 0 | 0 | 0 | 0 | 0 | 0 | 0 |
| 40 | 0 | 0 | 0 | 0 | 0 | 0 | 0 | 0 |
| 39 | 0 | 0 | 0 | 0 | 0 | 0 | 0 | 0 |
| 38 | 0 | 0 | 0 | 0 | 0 | 0 | 0 | 0 |
| 37 | 0 | 0 | 0 | 0 | 0 | 0 | 0 | 0 |
| 36 | 0 | 0 | 0 | 0 | 0 | 0 | 0 | 0 |
| 35 | 0 | 0 | 0 | 0 | 0 | 0 | 0 | 0 |
| 34 | 0 | 0 | 0 | 0 | 0 | 0 | 0 | 0 |
| 33 | 0 | 0 | 0 | 0 | 0 | 0 | 0 | 0 |
| 32 | 0 | 0 | 0 | 0 | 0 | 0 | 0 | 0 |
| 31 | 0 | 0 | 0 | 0 | 0 | 0 | 0 | 0 |
| 30 | 0 | 0 | 0 | 0 | 0 | 0 | 0 | 0 |
| 29 | 0 | 0 | 0 | 0 | 0 | 0 | 0 | 0 |
| 28 | 0 | 0 | 0 | 0 | 0 | 0 | 0 | 0 |
| 27 | 0 | 0 | 0 | 0 | 0 | 0 | 0 | 0 |
| 26 | 0 | 0 | 0 | 0 | 0 | 0 | 0 | 0 |
| 25 | 0 | 0 | 0 | 0 | 0 | 0 | 0 | 0 |
| 24 | 0 | 0 | 0 | 0 | 0 | 0 | 0 | 0 |
| 23 | 0 | 0 | 0 | 0 | 0 | 0 | 0 | 0 |
| 22 | 0 | 0 | 0 | 0 | 0 | 0 | 0 | 0 |
| 21 | 0 | 0 | 0 | 0 | 0 | 0 | 0 | 0 |
| 20 | 0 | 0 | 0 | 0 | 0 | 0 | 0 | 0 |
| 19 | 0 | 0 | 0 | 0 | 0 | 0 | 0 | 0 |
| 18 | 0 | 0 | 0 | 0 | 0 | 0 | 0 | 0 |
| 17 | 0 | 0 | 0 | 0 | 0 | 0 | 0 | 0 |
| 16 | 0 | 0 | 0 | 0 | 0 | 0 | 0 | 0 |
| 15 | 0 | 0 | 0 | 0 | 0 | 0 | 0 | 0 |
| 14 | 0 | 0 | 0 | 0 | 0 | 0 | 0 | 0 |
| 13 | 0 | 0 | 0 | 0 | 0 | 0 | 0 | 0 |
| 12 | 0 | 0 | 0 | 0 | 0 | 0 | 0 | 0 |
| 11 | 0 | 0 | 0 | 0 | 0 | 0 | 0 | 0 |
| 10 | 0 | 0 | 0 | 0 | 0 | 0 | 0 | 0 |
| 9 | 0 | 0 | 0 | 0 | 0 | 0 | 0 | 0 |
| 8 | 0 | 0 | 0 | 0 | 0 | 0 | 0 | 0 |
| 7 | 0 | 0 | 0 | 0 | 0 | 0 | 0 | 1 |
| 6 | 0 | 0 | 0 | 0 | 0 | 0 | 1 | 0 |
| 5 | 0 | 0 | 0 | 0 | 0 | 1 | 0 | 0 |
| 4 | 0 | 0 | 0 | 0 | 1 | 0 | 0 | 0 |
| 3 | 0 | 0 | 0 | 1 | 0 | 0 | 0 | 0 |
| 2 | 0 | 0 | 1 | 0 | 0 | 0 | 0 | 0 |
| 1 | 0 | 1 | 0 | 0 | 0 | 0 | 0 | 0 |
| 0 | 1 | 0 | 0 | 0 | 0 | 0 | 0 | 0 |

TRANSPARENT ERROR CORRECTING MEMORY

RELATED APPLICATIONS

This is a continuation in part of Pending U.S. patent application Ser. No. 10/003,602 Filed Nov. 14, 2001, "Error Correcting Memory And Method of Operating Same" by Wingyu Leung and Fu-Chieh Hsu. The present invention is also related to U.S. Pat. No. 6,147,535, entitled "Clock Phase Generator for controlling operation of a DRAM Array" by Wingyu Leung.

FIELD OF THE INVENTION

The present invention relates to semiconductor memory systems, such as static random access memory (SRAM) systems or dynamic random access memory (DRAM) systems. In particular, the present invention relates to a method and apparatus of error detection and correction in a semiconductor memory that works with on-chip built-in-self-test logic. The present invention is particularly applicable to embedded fault-tolerant memory, which incorporates error-correction circuitry (ECC) for both soft and hard error correction.

DISCUSSION OF RELATED ART

Semiconductors memories such as DRAM and SRAM devices are susceptible to both soft and hard errors. Soft errors are generated when sub-atomic energetic particles hit the memory device and generate charge high enough to upset the state of one or more memory cells. Hard errors are generated by defects in the semiconductor device during the manufacturing process. The incorporation of error detection and correction circuitry in memory devices has been described in many prior art schemes.

For example, U.S. Pat. No. 5,638,385, entitled "Fast Check Bit Write For A Semiconductor Memory" by John A. Fifield et al., describes the use of error-correction codes (ECC), such as error-correction check bits, in a memory using two different types of memory cells. Smaller and slower memory cells are used to store data bits, while larger and faster memory cells are for storing error-correction check bits. The faster cells provide faster write access to the error-correction check bits, thereby compensating for the delay associated with the generation of the error-correction check bits, and minimizing the impact of the ECC generation on the overall memory write latency. This, however, is accomplished at the cost of larger area.

U.S. Pat. No. 6,065,146, entitled "Error Correcting Memory" by Patrick Bosshart, describes an error-correcting memory that imposes no penalty on memory access latency or operating frequency. This error-correcting memory performs error correction only during a refresh operation of the memory, during a second or subsequent read operation of a burst read sequence, or during a write-back operation. As a result, the error correction scheme does not increase the read latency of the memory. Similarly, error correction check bits are only generated during refresh operations of the memory. As a result, the generation of error correction check bits does not increase the write latency of the memory. However, this error correction scheme cannot correct data errors occurring in the first read operation of a burst read sequence, or in data written to the memory before the error correction check bits are generated.

U.S. Pat. No. 5,003,542, entitled "Semiconductor Memory Device Having Error Correcting Circuit and Method For Correcting Error", by Koichiro Mashiko, et al., describes a memory that includes ECC circuitry incorporated in the sense amplifier area of the memory. More specifically, a second set of sense amplifiers and ECC correction logic is coupled to the bit lines of the memory array, thereby speeding up the error correction process by eliminating delays through the input/output (I/O) circuitry. However, this scheme requires that a second set of sense amplifiers and ECC correction logic be incorporated in each memory array. In general, there are many memory arrays in a memory device. As a result, this arrangement increases the array area and thus the silicon area of the memory. In addition, even though delays through the I/O circuit are eliminated, the delays through the ECC correction circuit still increase the memory cycle time. For a high-frequency memory, this increase is significant.

The addition of ECC storage and circuitry complicates memory testing. To ensure 100% stuck-at fault coverage, prior art memory devices with ECC include circuitry that allows the ECC bits to be directly accessible during testing, with ECC generation and correction suppressed. Thus, the memory storage of the ECC bits and the data bits are tested in parallel with the ECC bits treated like the data bits. The direct access scheme requires the memory interface to provide extra inputs and outputs for the ECC bits and the additional control. Such a scheme is described in "A 50-ns 16-Mb DRAM with a 10-ns Data Rate and On-Chip ECC", by H. L. Kalter et al., IEEE JSSC, vol. 25, no. 5, October 1990, pp. 1118-1127.

In the embedded environment, where error-correction is hidden from the application, the ECC bits cannot be directly accessed for testing. This is especially true for a design in which memory macros with ECC are used to replace existing memory macros that do not have built-in ECC. In this case, the memory macro with ECC must have the same pin out and functionality as the memory macro being replaced.

It would therefore be desirable to incorporate ECC logic in a memory such that this logic is transparent to the application. It would further be desirable if this memory could be tested with a minimum set of test vectors to achieve 100 percent fault coverage.

In general, it would be desirable to have an improved error detection and correction scheme that overcomes the above-described deficiencies of the prior art.

SUMMARY

Accordingly, the present invention provides a memory device or an embedded memory block that includes an array of memory cells with built-in ECC protection. In one embodiment, the memory cells are DRAM cells. In another embodiment, the memory cells are SRAM cells. The error-correction code function is designed so that the error-correction code generation does not increase the write access time of the memory device. The scheme also provides for write-back of corrected data without decreasing the operating frequency of the memory device.

To eliminate the effect of ECC generation on the write access time, a write buffer is used to facilitate a posted write scheme. During a first write access, a first write data value and the corresponding first write address are stored in a first entry of the write buffer. At this time, an error correction circuit generates a first error correction code in response to the first write data value. During a second write access, the first write data value and the first error correction code are transferred to a second entry of the write buffer and retired to the memory array. At the same time, a second write data value and a corresponding second write address are stored in the first entry of the write buffer. After the second write data value is stored in the first entry of the write buffer, the error correction circuit generates a second error correction code in response to the second write data value. The second write data value, second write address and second error correction code are stored in the write buffer until the next write operation. Because the error correction code is generated in parallel with the retiring of a previous write data value, and because the error correction circuit and write buffer operate faster than the memory array, the error correction code generation does not impose a penalty on the memory cycle time or the write access time.

Error detection and correction is also performed on data values read from the memory device. During a read access, a read data value and the corresponding ECC word are read from the memory array and provided to an error detection-correction circuit. The error detection-correction circuit provides a corrected read data value that is driven to the output of the memory device. The error detection-correction circuit also provides a corrected ECC word, and an error indicator signal, which indicates whether the read data value or corresponding ECC word included an error. In one embodiment, the error indicator signal indicates whether the read data value or corresponding ECC word included a single error bit. If the error indicator signal is activated, the corrected read data value and corrected ECC word are posted in the write-back buffer at the same time that the corrected read data value is driven to the output of the memory device. The corrected read data value and ECC word in the write-back buffer are retired to the memory array during an idle cycle of the memory array, during which no external access is performed. By retiring the corrected read data value and ECC word during an idle cycle, the write-back scheme does not have an adverse affect on the memory cycle time.

The number of entries in the write-back buffer is limited. Therefore the entries of the write-back buffer can be exhausted during a period of many consecutive read accesses that have correctable errors. In this case, an allocation policy can be executed to either drop the earliest entry in the write-back buffer (FIFO policy) or stop accepting entries in the write-back buffer (LIFO policy). The chance of having to invoke the allocation policy is small, because the number of words containing errors in the memory at a given time is small. The chance of reading all of these error words without a sufficient number of idle cycles in between is even smaller. Moreover, the allocation policy does not stop the memory device from functioning correctly, because a read data value/ECC word that contains an error, but cannot be posted in the write-back buffer, can still be accessed from the memory array, corrected by the error detection-correction circuit, and then driven to the memory output, as long as the data value/ECC word does not accumulate more error bits than the error correction circuit can correct. The write-back buffering decouples the memory array operation from the error correction operation, because the memory array does not need to wait for the corrected data before completing the access cycle. Therefore, the memory cycle time is not affected by the write-back operation. The read latency, however, is increased, because the data needs to propagate through the error detection correction unit before being driven to the output of the memory.

As described above, the embedded ECC circuitry is designed to operate completely transparently during normal operations. In accordance with another embodiment, the embedded ECC circuitry is designed such that the memory test coverage is not compromised. In accordance with one embodiment, the embedded ECC for a memory is selected so that a simple march algorithm with minor modification can be used for testing the memory with 100% stuck at fault coverage by accessing the data bits only.

From the outside of the memory, the ECC storage and logic are completely transparent. Since the ECC bits are not directly accessible, faults in these bits are not directly observable during testing. Because the ECC logic is designed to correct single-bit errors, such single-bit errors in the data word or the ECC code are self-corrected by the ECC circuit in the memory. Single-bit errors are thus not classified as faults as they do not affect the functionality of the memory. Multiple-bit (two or more bits) errors, however, cannot be corrected by the embedded ECC logic. Multiple-bit errors are therefore real faults that must be detected during memory testing. Fault coverage is a measure of the effectiveness of the memory tests, carried out either by BIST or external ATE, in detecting these faults. In general, the greater the number of test data patterns and algorithms, the higher the fault coverage. However, an increase in the number of test data patterns and test algorithms results in a longer test time, higher complexity in the BIST logic, and thus, higher cost. The present invention advantageously selects a set of ECC codes and a set of test data patterns so that 100% stuck at fault coverage is achieved without directly accessing the ECC bits.

The present invention will be more fully understood in view of the following description and drawings.

BRIEF DESCRIPTION OF THE DRAWINGS

FIG. 10 is a controllability matrix reduced from the ECC matrix of FIG. 8.

DETAILED DESCRIPTION

Figure 1:
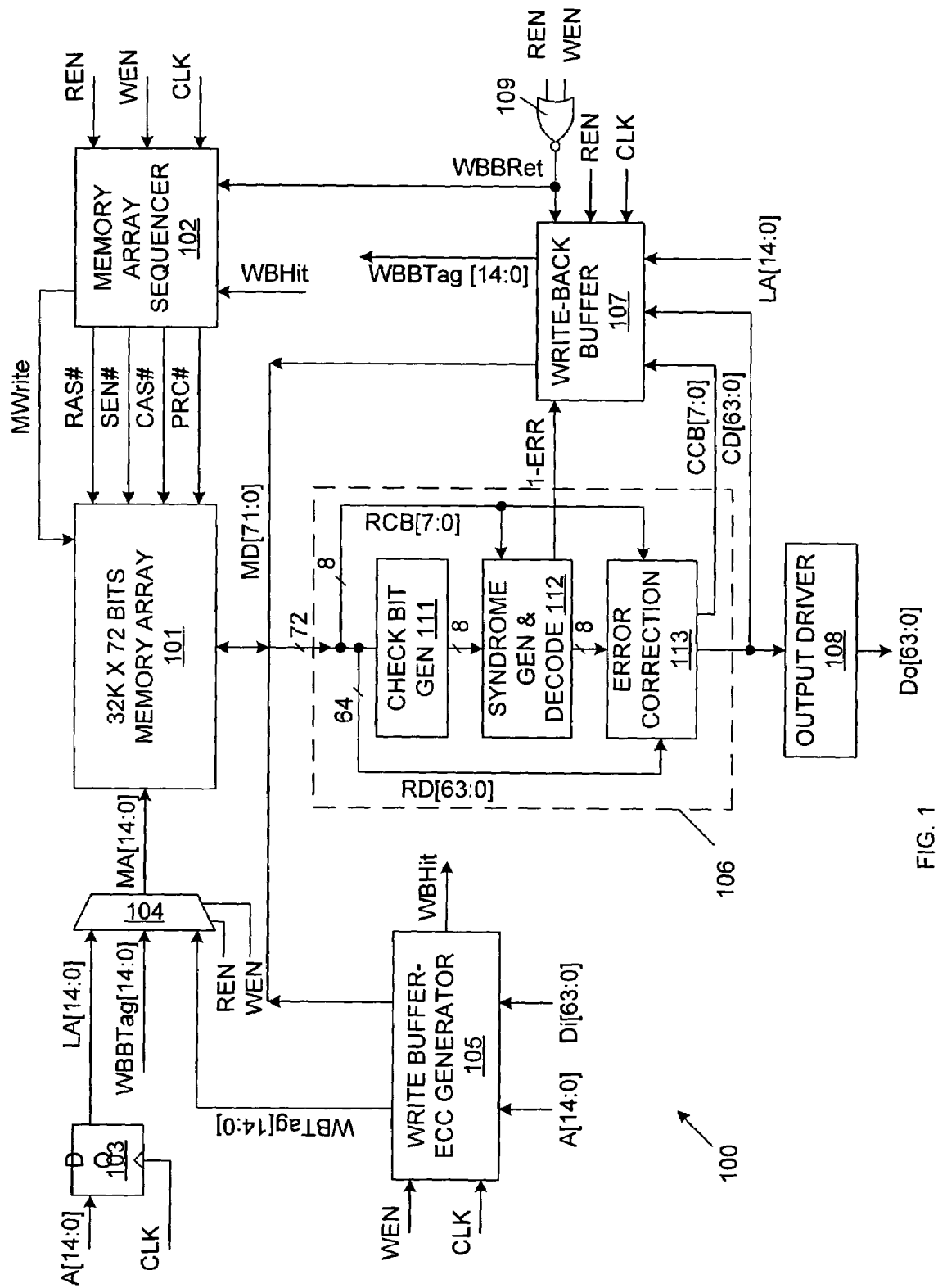
FIG. 1 is a block diagram of a memory device in accordance with one embodiment of the present invention.

FIG. 1 is a block diagram of a memory device 100 in accordance with one embodiment of the present invention. Memory device 100 includes memory array 101, memory array sequencer 102, address register 103, multiplexer 104, write buffer/ECC generator 105, error detection/correction circuit 106, write-back buffer 107, output driver 108 and NOR gate 109. The external interface of memory device 100 includes a 64-bit input data bus Di[63:0], a 64-bit output data bus Do[63:0], a read enable line REN, a write enable line WEN, a clock line CLK, and a 15-bit address bus A[14:0]. In the described embodiments, each bus/line and the corresponding signal are identified using the same reference element. For example, Di[63:0] is used to identify both the input data bus and the input data value transmitted on the input data bus.

In the described example, memory array 101 is a conventional 32 k×72-bit memory array, although this is not necessary. In the described embodiment, memory array 101 includes a plurality of sub-arrays. Each sub-array includes word line drivers for the activation of a selected word line, and sense-amplifiers for the amplification of signals from the selected memory cells. Memory array 101 also contains address decoders for accessing the memory cells selected by the memory address MA[14:0] provided by multiplexer 104. Memory array 101 includes circuitry that is well known to those of ordinary skill in the art of memory design.

Memory array 101 uses DRAM cells in the described embodiment, although SRAM cells can be used in an alternate embodiment. The refresh of the DRAM cells is managed by circuitry outside of memory device 100 by performing periodic read accesses on all of the word lines of memory array 101. Additional logic can also be easily incorporated to adapt to the refresh scheme described in commonly-owned U.S. Pat. No. 6,028,804, "Method and Apparatus For 1-T SRAM Compatible Memory". The operation of memory array 101 is controlled by memory array sequencer 102, which generates a row access select signal RAS#, a sense amplifier enable signal SEN#, a column address select signal CAS# and a pre-charge signal PRC#. The functionality of these control signals and the operation of memory array sequencer 102 are described in more detail in commonly owned U.S. Pat. No. 6,147,535, entitled "Clock Phase Generator For Controlling Operation of a DRAM Array". In the described embodiment, memory array sequencer 102 sequentially asserts the RAS#, SEN#, CAS# and PRC# signals in a predetermined manner to enable a memory access to be completed during a single clock cycle.

Address multiplexer 104 routes an input address MA[14:0] to memory array 101 from one of three different sources. One source is a latched address signal LA[14:0], which is driven by the output of address register 103. Another source is the write buffer tag address WBTag[14:0], which is driven by the address field of write buffer/ECC generator 105. The third source is the write-back buffer tag address WBBTag[14:0], which is driven by the address field of write-back buffer 107. Address multiplexer 104 is controlled by the read enable signal REN and the write enable signal WEN. As described in more detail below, multiplexer 104 passes the latched address signal LA[14:0] during a read operation, when the read enable signal REN is asserted and the write enable signal WEN is de-asserted. Multiplexer 104 passes the write buffer tag address WBTag[14:0] during a write operation, when the write enable signal WEN is asserted and the read enable signal REN is de-asserted. Finally, multiplexer 104 passes the write-back buffer tag address WBBTag[14:0] during a write-back operation, when both the write enable signal WEN and the read enable signal REN are de-asserted.

Data input to memory array 101 and data output from memory array 101 is transmitted as a 72-bit memory data word MD[71:0] on a 72-bit data bus. The 72-bit data word MD[71:0] includes two fields: a 64-bit data field and a 8-bit error correction code (ECC) field. At the beginning of a memory cycle (as indicated by the falling edge of the RAS# signal), the 72-bit memory data word MD[71:0] is latched into a data register (not shown) in memory array 101.

Figure 2:
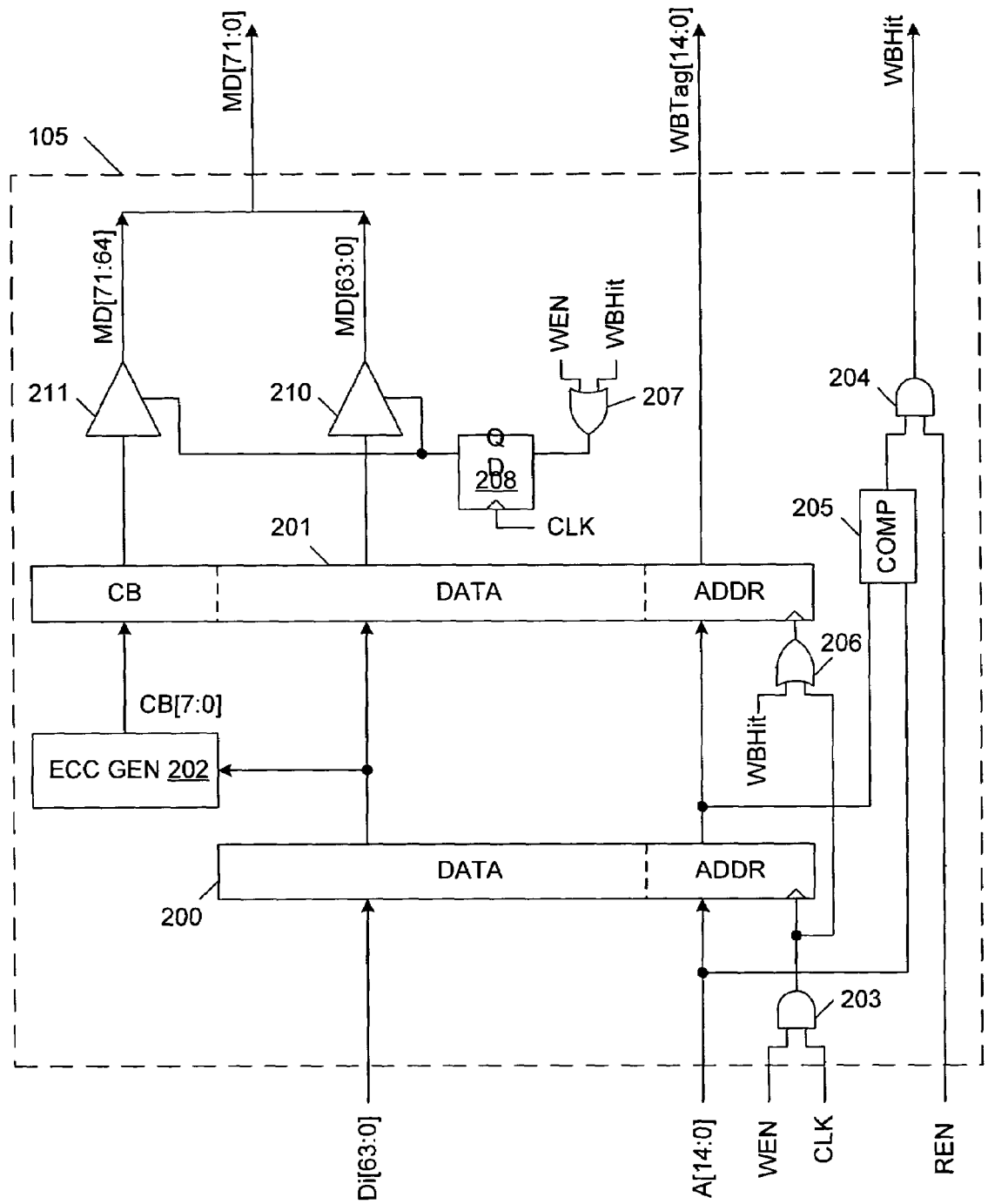
FIG. 2 is a block diagram of a write buffer-error correction code (ECC) generator in accordance with one embodiment of the present invention.

FIG. 2 is a block diagram of write buffer/ECC generator 105 in accordance with one embodiment of the present invention. In the described embodiment, write buffer/ECC generator 105 includes input register 200, output register 201, error correction code (ECC) generator 202, AND gates 203-204, comparator 205, OR gates 206-207, D type flip-flop 208, and tri-state output buffers 210-211. Write buffer/ECC generator 105 includes registers 200 and 201. Registers 200-201 are configured into a first-in, first-out (FIFO) configuration. Input register 200 contains 79-bits for storing one address entry (15-bits) and one data entry (64-bits). Output register 201 contains 87-bits for storing one address entry (15-bits), one data entry (64-bits), and the associated error correction code (8-bits) generated by ECC generator 202.

Write buffer/ECC generator 105 operates as follows. At the beginning of a first memory write access, a first write data value $Di_1[63:0]$ and a corresponding first write address $Ai_1[14:0]$ are applied to input register 200, and the write enable signal WEN is asserted high. The clock signal CLK subsequently transitions to a logic high state, thereby causing AND gate 203 to provide a logic high signal to enable input register 200. In response, input register 200 latches the first write data value $Di_1[63:0]$ and the corresponding first write address $Ai_1[14:0]$. The first write data value $Di_1[63:0]$ is applied to ECC generator 202. In response, ECC generator 202 generates a first error correction check bit signal $CB_1[7:0]$.

At the beginning of a second (subsequent) memory write access, a second write data value $Di_2[63:0]$ and a corresponding second write address $Ai_2[14:0]$ are applied to input register 200, and the write enable signal WEN is asserted to a logic high value. The clock signal CLK subsequently transitions to a logic high value, thereby causing AND gate 203 to provide a logic high signal to enable register 200, and causing OR gate 206 to provide a logic high signal to enable register 201. In response, the first write data value $Di_1[63:0]$, the first write address $Ai_1[14:0]$ and the first check bit $CB_1[7:0]$ are latched into output register 201. In addition, the second write data value $Di_2[63:0]$ and the second write address $Ai_2[14:0]$ are latched into input register 200.

The logic high write enable signal WEN also causes OR gate 207 to provide a logic high signal to flip-flop 208. This logic high signal is latched into flip-flop 208 in response to the rising edge of the CLK signal. As a result, flip-flop 208 provides a logic high signal to the enable terminals of tri-state output buffers 210 and 211, thereby enabling these buffers. In response, output buffers 210 and 211 drive the first write data value $Di_1[63:0]$ and the first check bit $CB_1[7:0]$ from output register 201 to memory data bus MD[71:0]. The first write address value $Ai_1[14:0]$ is routed from output register 201 as write buffer tag address WBTag[14:0]. The write buffer tag address WBTag[14:0] is routed through multiplexer 104 to memory array 101 (FIG. 1) in response to the logic high WEN signal and the logic low REN signal. The first write data value $Di_1[63:0]$ and the first check bit CB$_1$[7:0] (i.e., memory data word MD[71:0]) is written to memory array 101 at the location identified by write buffer tag address WBTag[14:0].

In the foregoing manner, write buffer/ECC generator 105 operates as a posted write buffer. That is, during a write access cycle, data and address values previously posted to write buffer/ECC generator 105 are used to perform a write access to memory array 101. New data and address values are posted to register 200, and corresponding check bits are generated during the same write access cycle. Registers 200-201 and ECC generator 202 are significantly faster than memory array 101. As a result, the operations performed within write buffer/ECC generator 105 do not slow down write accesses to memory array 101.

Note that it is necessary to maintain data coherence if a read access hits the contents of write buffer/ECC generator 105. To maintain data coherence, comparator 205 is coupled to receive both the current access address A[14:0] and the write address previously posted to input register 200. Comparator 205 asserts a logic high MATCH output signal if the current access address matches the write address stored in input register 200. The MATCH signal and the read enable signal REN are both provided to AND gate 204. If comparator 205 detects a match, and the current access is a read access (REN="1"), then AND gate 204 will assert a logic high write buffer hit signal WBHit, thereby indicating that the current read access has hit the contents of write buffer/ECC generator 105.

The WBHit signal is applied to an input terminal of memory access sequencer 102. When the WBHit signal is asserted to a logic high value, memory access sequencer 102 is prevented from generating the access control signals RAS#, SEN#, CAS#, and PRC#, thereby suppressing access to memory array 101. Instead, the read data is provided by write buffer/ECC generator 105 in the manner described below.

Within write buffer/ECC generator 105, the WBHit signal is applied to input terminals of OR gates 206 and 207. Thus, when the WEHit signal is asserted high, OR gate 206 provides a logic high signal to the clock input terminal of register 201. Consequently, the write data, write address and associated check bits stored in input register 201 are latched into output register 200 at this time. OR gate 207 provides a logic high signal to flip-flop 208. This logic high signal is latched into flip-flop 208 in response to the rising edge of the CLK signal. Tn-state output buffers 210 and 211 are enabled in response to the logic high signal latched into flip-flop 208. As a result, the data value and the corresponding ECC value stored in output register 201 are driven onto data bus MD [71:0]. The data and ECC values on data bus MD[71:0] are routed to error detection/correction unit 106. In response, error detection/correction unit 106 provides a corrected data value, which is routed through output driver 108 to data output bus Do[63:0], thereby completing the read access.

Although the present example uses output register 201, this element of write buffer 105 is not required in all embodiments. For example, the address stored in input register 200 can be driven directly as the write buffer tag address WBTag[14:0], the data value stored in input register 200 can be provided directly to output driver 210, and the corresponding check bits CB[7:0] can be provided directly to output driver 211. During a subsequent write operation, the data and address values stored in register 200 and the check bits provided by ECC generator 202 are latched directly into registers in memory array 101, thereby eliminating the need for output register 201.

Error Detection-Correction

Error detection/correction circuit 106 will now be described. Many different error detection/correction codes can be used in the present invention. For example, the odd-weight Hamming code discussed in U.S. Pat. No. 5,638,385, entitled "Fast Check Bit Write For a Semiconductor Memory" by John A. Fifield et al, and "Cost Analysis of On Chip Error Control Coding for Fault Tolerant Dynamic RAMs," by N. Jarwala et al, Proceedings of the Seventeenth International Symposium on Fault-Tolerant Computing, Pittsburgh, Pa., Jul. 6-8, 1987, pp. 278-283 can be used in one embodiment. In the described embodiment, the odd-weight Hamming Code discussed in "16-bit CMOS Error Detection And Correction Unit", Integrated Device Technology, Inc. Data Book, April 1990, Section 5.10, pp. 1-19 is used. The 72-bit modified Hamming Code provides single-bit error correction and double-bit error detection. The 72-bit code includes 64 data bits, and 8 check bits.

Implementation of error detection/correction using odd-weight Hamming code has been described in references including U.S. Pat. No. 5,638,385, entitled "Fast Check Bit Write For A Semiconductor Memory" by John A. Fifield et al., and "A Class Of Optimal Minimum Odd-Weight-Column SEC-DED Codes", by M. Y. Hsiao, IBM Journal of Research and Dev., Vol. 14, July, 1970, pp. 395-401. In a preferred embodiment, error detection/correction unit 106 uses mainly combinational logic. For syndrome generation, 3 levels of 4-input and 3-input exclusive OR gates can be used. For syndrome decoding, 5-input AND gates can be used. This kind of implementation using combinational logic is well known to the art of logic design and therefore is not described further.

Error detection/correction unit 106 includes check bit generator 111, syndrome generator and decoder 112, and error correction unit 113. During a read access, the odd-weight Hamming code is read from memory array 101 and driven on memory data bus MD[71:0]. Within error detection/correction unit, the memory bus is split into two fields: the read data word field RD[63:0] and the read check bit field RCB[7:0]. The read data word RD[63:0] is input to check bit-generator 111. The check-bit generator 111, similar to ECC generator 202 (FIG. 2), generates an 8-bit ECC check bit value in response to read data word RD[63:0]. This ECC check bit value is provided to syndrome generator and decoder 112. Syndrome generator and decoder 112 bit-wise compares (exclusive OR's) the read check bits RCB[7:0] with the corresponding ECC check bits provided by check bit generator 111. The resultant 8-bit syndrome word is decoded to determine whether the 72-bit code read from the memory array is free of error, contains a single-bit error, or contains multiple-bit errors. In the case of a single-bit error, syndrome generator and decoder 112 generates an 8-bit signal identifying the location of the error bit from the syndrome, and activates a single-error identifier signal (1-ERR) to a logic high state. The 8-bit syndrome signal identifying the location of the error bit is transmitted to error correction unit 113. In response, error correction unit 113 corrects the error bit, which may exist in either the read data word RD[63:0] or the ECC check bit value RCB[7:0]. If no error is detected, the read data word RD[63:0] and ECC check bit value RCB[7:0] are not modified. In the case of multiple bit error, neither the read data word RD[63:0] nor the ECC check bit value RCB[7:0] is modified.

The read data value provided by error correction unit 113 is labeled as corrected data value CD[63:0] (even though it is understood that error correction unit 113 may not make any corrections to the read data value). Similarly, the ECC check bit value provided by error correction unit is designated as corrected ECC check bit value CCB[7:0]. The corrected data value CD[63:0] is driven through output driver 108 to the output data bus Do[63:0]. Both the corrected data value CD[63:0] and the corrected ECC check bit value CCB[7:0] are also driven to write-back buffer 107. If the single-error indicator signal 1-ERR is asserted high, the corrected data value CD[63:0], the corrected ECC check bit value CCB[7:0], and the corresponding latched address LA[14:0] associated with the read access are all written to write-back buffer 107. As described in more detail below, the corrected data value CD[63:0] and the corrected ECC check bit value CCB[7:0] are queued in write-back buffer 107, in anticipation of a write-back operation to memory array 101.

Write-Back Buffer

Figure 3:
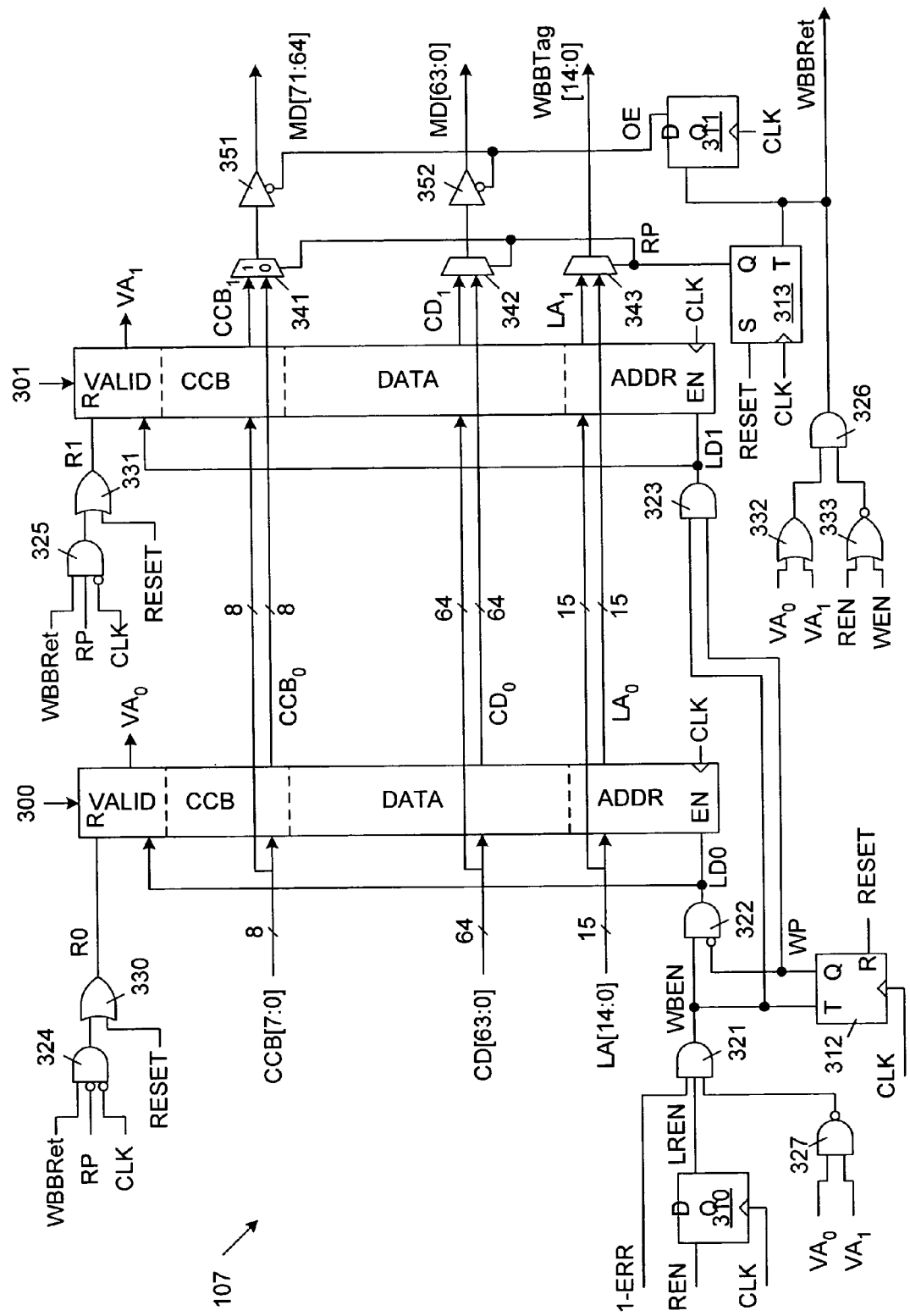
FIG. 3 is a circuit diagram illustrating a write-back buffer in accordance with one embodiment of the present invention.

FIG. 3 is a circuit diagram illustrating write-back buffer 107 in accordance with one embodiment of the present invention. In this embodiment, write-back buffer 107 includes registers 300-301, D-type flip-flops 310-311, toggle flip-flops 312-313, AND gates 321-326, NAND gate 327, OR gates 330-332, NOR gate 333, output multiplexers 341-343 and tri-state output drivers 351-352. Registers 300-301 provide storage for 2 entries, wherein each entry includes an address field (ADDR), a data field (DATA) a correction check bit field (CCB) and a valid bit field (VALID). The valid bit field, when set to a logic '1' value, indicates that the contents of the corresponding register are valid and should be written-back to memory array 101. Registers 300 and 301 are arranged in a FIFO configuration in the described embodiment.

The address fields of registers 300 and 301 are coupled to receive the latched address signal LA[14:0], the data fields of registers 300 and 301 are coupled to receive the corrected data value CD[63:0], and the correction check bit fields of registers 300 and 301 are coupled to receive the corrected check bits CCB[7:0]. The address, data, correction bit and valid fields of register 300 are labeled $LA_0$, $CD_0$, $CCB_0$ and $VA_0$, respectively. The address, data, corrected check bit and valid fields of register 301 are labeled $LA_1$, $CD_1$, $CCB_1$ and $VA_1$, respectively. Corrected check bit values $CCB_0$ and $CCB_1$ stored in registers 300 and 301 are provided to multiplexer 341. Corrected data values $CD_0$ and $CD_1$ stored in registers 300 and 301 are provided to multiplexer 342. Latched address values $LA_0$ and $LA_1$ stored in registers 300 and 301 are provided to multiplexer 343.

Multiplexers 341-343 are controlled by the Q output of toggle flip-flop 313, which operates as a read pointer value, RP. If the read pointer value RP provided by flip-flop 313 has a logic "0" value, then multiplexers 341, 342 and 343 route the $CCB_0$, $CD_0$ and $LA_0$ values, respectively. Conversely, if the read pointer value RP has a logic "1" value, then multiplexers 341, 342 and 343 route the $CCB_1$, $CD_1$ and $LA_1$ values, respectively.

The outputs of multiplexers 341 and 342 are routed to tri-state output drivers 351 and 352, respectively. Tri-state drivers 351 and 352 are controlled by the output enable signal OE provided at the Q output terminal of flip-flop 311. When enabled, tri-state buffers 351 and 352 drive the signals received from multiplexers 341 and 342 as memory data output signals MD[71:64] and MD[63:0], respectively. The output of multiplexer 343 is directly provided as write-back buffer tag address WBBTag[14:0].

In general, write-back buffer 107 operates as follows. When a single error is detected by error detection/correction unit 106 during a read operation, the corrected data value 1 the corrected check bit value and the associated address value are written to one of registers 300-301 in write-back buffer 107. During a subsequent idle cycle, the corrected data value and corrected check bit value are written back to memory array 101 at the location specified by the associated address value.

The operation of write-back buffer 107 will now be described in more detail. To initialize write-back buffer 107, the RESET signal is initially asserted high. In response, OR gates 330 and 331 provide logic high reset values R0 and R1 to registers 300 and 301, respectively. These logic high reset values RO and Rl asynchronously reset the VALID bit fields of registers 300 and 301 to logic "0" values (i.e., $VA_0$ = $VA_1$ = "0"). The logic "0" VALID bits $VA_0$ and $VA_1$ cause OR gate 332 to provide a logic "0" output signal to AND gate 326, thereby forcing the write-back buffer retire signal WBSRet to a logic "0" value. The logic "0" WBBRet signal is latched into flip-flop 311, such that the output enable signal OE initially has a logic "0" value, thereby disabling tri-state output drivers 351-352. When the WBERet signal has a logic "0" value, no corrected data values are written back to memory array 101. The logic "0" WBBRet signal is also applied to AND gates 324 and 325. As a result, the WBBRet signal causes the reset values R0 and Rl provided by OR gates 330 and 331 to initially remain at logic "0" values after the RESET signal transitions to a logic "0" value.

The logic high RESET signal also sets the read pointer value RP provided by toggle flip-flop 313 to a logic.

The logic high RESET signal also sets the read pointer value RP provided by toggle flip-flop 313 to a logic "1" value, such that multiplexers 341-343 are initially set to pass the $CCB_1$, $CD_1$ and $LA_1$ values, respectively, from register 301.

The logic high RESET signal also resets the Q output of toggle flip-flop 312 to a logic "0" value. The Q output of toggle flip-flop 312 operates as a write pointer value WP. When the write pointer value WP is low, register 300 is designated to receive the corrected check bit value CCB[7:0], the corrected data value CD[63:0], and the latched address value LA[14:0]. Conversely, when the write pointer value WP is high, register 301 is designated to receive these values CCB[7:0], CD[63:0] and LA[14:0]. More specifically, when the write pointer value WP is low, AND gate 322 is enabled to pass the write buffer enable signal WBEN to the enable input terminal of register 300 as the load signal LD0. When the write pointer value WP is high, AND gate 323 is enabled to pass the write buffer enable signal WBEN to the enable input terminal of register 301 as the load signal LD1.

The write buffer enable signal WBEN is provided by AND gate 321. AND gate 321 is coupled to receive the 1-ERR signal from error detection-correction circuit 106. AND gate 321 is also coupled to receive a latched read enable signal LREN provided at the Q output of flip-flop 310. (The read enable signal REN is latched into flip-flop 310 in response to the CLK signal to provide the latched read enable signal LREN). AND gate 321 is also coupled to receive the output of NAND gate 327, which has input terminals coupled to receive valid bits $VA_0$ and $VA_1$. Thus, the write buffer enable signal WBEN signal will be asserted high if there is a single error detected in a read data value (1-ERR="1") during a read operation (LREN="1") and there is an available entry in one of registers 300 and 301 ($VA_0$ and $VA_1$ not ="11").

The first time that there is a single error detected during a read operation, the write buffer enable signal WBEN is asserted high. In response to the high WBEN signal and the low write pointer value WP, AND gate 322 asserts a logic high load signal LD0, which enables register 300. In response, the CCB[7:0], CD[63:0] and LA[14:0] values provided during the read operation are latched into register 300. In addition, the logic high LD0 signal is latched into the VALID field of register 300, thereby setting valid bit $VA_0$ to a logic high state.

The logic high valid bit $VA_0$ causes OR gate 332 to provide a logic high signal to AND gate 326. During a subsequent idle cycle when there are no pending read or write accesses (i.e., REN=WEN="0"), AND gate 326 will receive a logic high signal from NOR gate 333. Under these conditions, the write-back buffer retire signal WBBRet is asserted high, thereby indicating that the contents of register 300 can be retired to memory array 101, without interfering with a read or write operation. On the next rising edge of the CLK signal, the logic high WBBret signal toggles the read pointer value RP provided by flip-flop 313 to a logic "0" value, and causes the output enable signal OE of flip-flop 311 to transition to a logic "1" value. At this time, multiplexers 341-343 route the $CCB_0$, $CD_0$ and $LA_0$ signals from register 300. Tri-state buffers 351 and 352 are enabled to drive the $CCB_0$ and $CD_0$ values from register 300 as the MD[71:64] and MD[63:0] values in response to the logic high output enable signal OE. The latched address value $LA_0$ from register 300 is provided to memory array 101 as the write back buffer tag address WBBTag[14:0]. Note that the WBBTag[14:0] signal is routed through address multiplexer 104 in response to the logic low REN and WEN signals.

The logic high WBBRet signal is also provided to memory array sequencer 102, thereby initiating the generation of the memory control signals (RAS#, SEN#, CAS#, PRC#) required to write the corrected data back to memory array 101. At this time, the corrected data value $CD_0$ and corrected check bit value $CCB_0$ are written back to memory array 101 at the location identified by address value $LA_0$.

The CLK signal subsequently transitions to a logic low level. At this time, the logic low CLK signal, the logic high WBBRet signal and the logic low read pointer value RP cause AND gate 324 to provide a logic high output signal. In response, OR gate 330 asserts a logic high reset signal R0, which resets the valid bit $VA_0$ in register 300 to a logic "0" value. The logic low $VA_0$ bit causes the WBBRet signal to transition to a logic low value.

As described above, the entry stored in register 300 is retired during an idle cycle (i.e., WEN=REN="0"). However, as long as consecutive read or write operations occur, there will be no idle cycle during which the entry in register 300 can be retired. In this case, this entry remains in register 300.

If another read operation (REN="1") having a single error (1-ERR="1") occurs before the next idle cycle, AND gate 321 will again assert the write buffer enable signal WBEN to a logic "1" value. The logic "1" value of the WBEN signal causes flip flop 312 to toggle, such that the write pointer value WP is changed to a logic "1" value. This logic high WP signal causes AND gate 323 to assert a logic high load signal LD1. In response, the CCB[7:0], CD[63:0] and LA[14:0] signals associated with the current read operation are loaded into register 301 as values $CCB_1$, $CD_1$ and $LA_1$, respectively. The logic high load signal LD1 is also loaded into the VALID field of register 301, such that valid bit $VA_1$ has a logic high value.

At this time, both of the valid bits $VA_0$ and $VA_1$ have logic "1" values. As a result, NAND gate 327 provides a logic "0" value to AND gate 321. Consequently, the write buffer enable signal WBEN cannot be asserted until at least one of the valid bits $VA_0$ and $VA_1$ transitions to a logic "0" value. That is, no additional entries can be written to write-back buffer 107 until the entry stored in register 300 has been retired to memory array 101. Note that if a single error condition exists during a subsequent read operation (before the entry in register 300 can be retired), then the corresponding corrected data value/check bits will not be written back to memory array 101. However, the corrected data value will be read out of memory device 100. Thus, failure to write-back the corrected value does not result in failure of memory device 100. It is likely that the next time that this data value/check bit is read from memory array 101, space will be available in write-back buffer 107, such that the corrected data value/check bit can be properly written back to memory array 101.

Specific examples of write, read and write-back operations will now be described.

Write Access Timing

Figure 4:
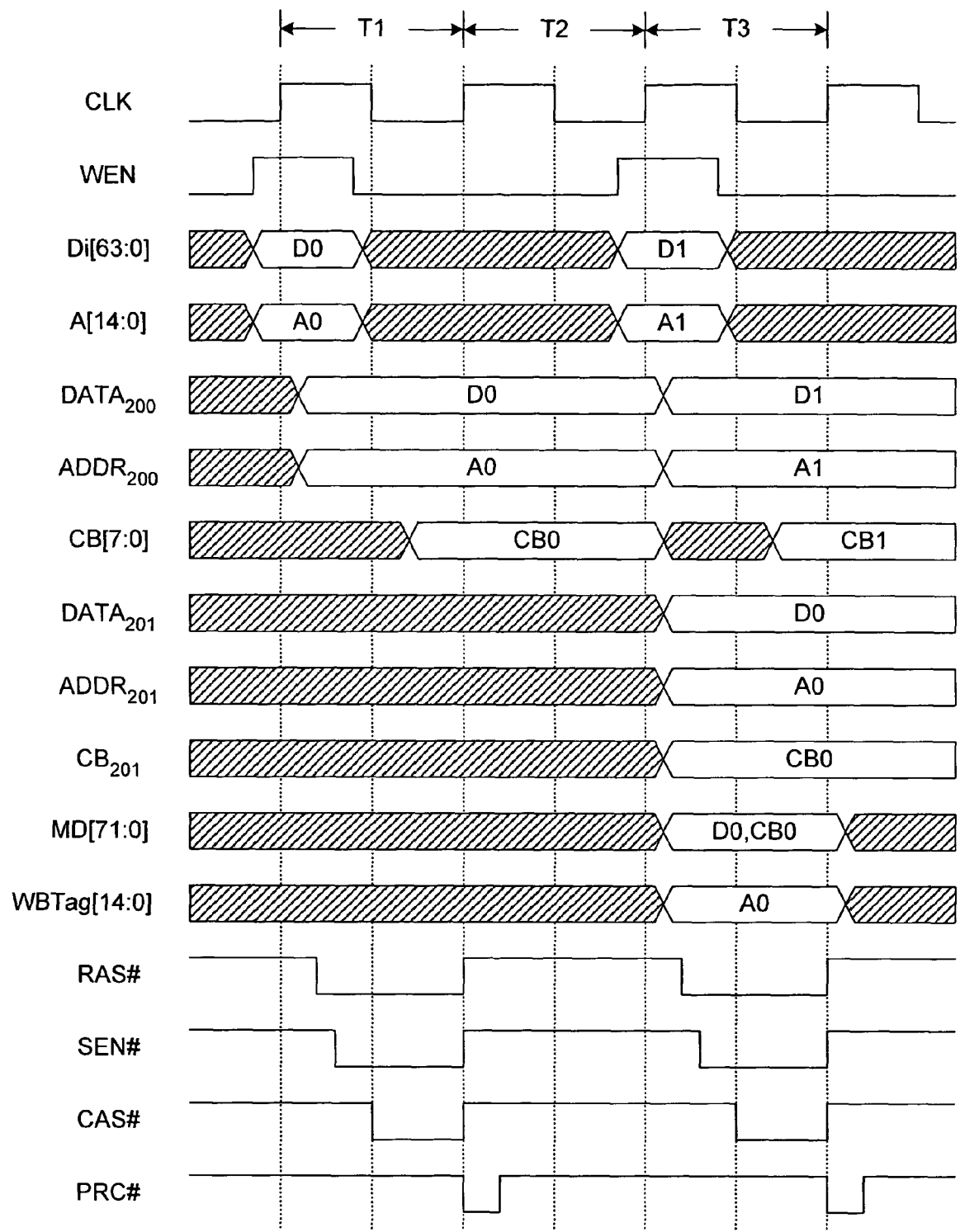
FIG. 4 is a waveform diagram illustrating the timing of a write access in accordance with one embodiment of the present invention.

FIG. 4 is a waveform diagram illustrating the timing of two write accesses in accordance with one embodiment of the present invention. Prior to the rising edge of clock cycle T1, the write enable signal WEN is asserted high, a first write data value D0 is provided on input data bus Di[63:0], and a first write address value A0 is provided on address bus A[14:0]. At the rising edge of clock cycle T1, the first write data value D0 and the first write address A0 are latched into register 200. In FIG. 4, the write data value stored in register 200 is designated as $DATA_{200}$ and the address value stored in register 200 is designated as $ADDR_{200}$. During cycle T1, ECC generator 202 generates an ECC check bit value, CB0, in response to the first write data value D0 stored in register 200. Note that memory array sequencer 102 asserts the memory control signals RAS#, SEN#, CAS# and PRC# during the first clock cycle T1 in response to the logic high write enable signal WEN. However, this write access is ignored in the present example for reasons of clarity.

No write access is performed during clock cycle T2 (i.e., the WEN signal is low). As a result, the first write data value D0 and the first write address A0 remain latched in register 200 during cycle T2.

Prior to the rising edge of clock cycle T3, the write enable signal WEN is asserted high, a second write data value D1 is provided on input data bus Di[63:0], and a second write address value A1 is provided on address bus A[14:0]. At the rising edge of clock cycle T3, the first write data value D0, the first write address A0 and the first ECC check bit value CB0 are latched into register 201. In FIG. 4, the write data value stored in register 201 is designated as $DATA_{201}$, the address value stored in register 201 is designated as $ADDR_{201}$, and the ECC check bit value stored in register 201 is designated as $CB_{201}$. Also at the rising edge of clock cycle T3, the second write data value D1 and the second write address value A1 are latched into register 200. During cycle T3, ECC generator 202 generates an ECC check bit value, CB1, in response to the second write data value D1 stored in register 200.

The logic high write enable signal WEN enables output buffers 210 and 211, such that these output buffers drive the first data value D0 and the first ECC check bit value CB0 from register 201 onto memory data bus MD[71:0]. The first write address A0 is provided from register 201 as the write buffer tag signal WBTag[14:0]. This write buffer tag signal WBTag[14:0] is routed through multiplexer 104 to memory array 101 in response to the logic high write enable signal. Memory array sequencer, asserts the memory write signal Mwrite and the memory control signals RAS#, SEN#, CAS# and PRC# in response to the logic high write enable signal WEN during cycle T3, thereby enabling the first write data value D0 and the first ECC check bit value CB0 to be written to memory array 101 at the location specified by the first write address A0. Note that the second write data value D1 and the second write address A1 remain in register 200 until the next write access (or the next read access that hits write buffer 105). Also note that ECC check bit value CB1 are waiting at the output of ECC generator 202 until the beginning of the next write access. In this manner, the generation of ECC check bit values doe not affect the write access latency of memory device 100.

Single Read Access and Write-Back Timing

Figure 5:
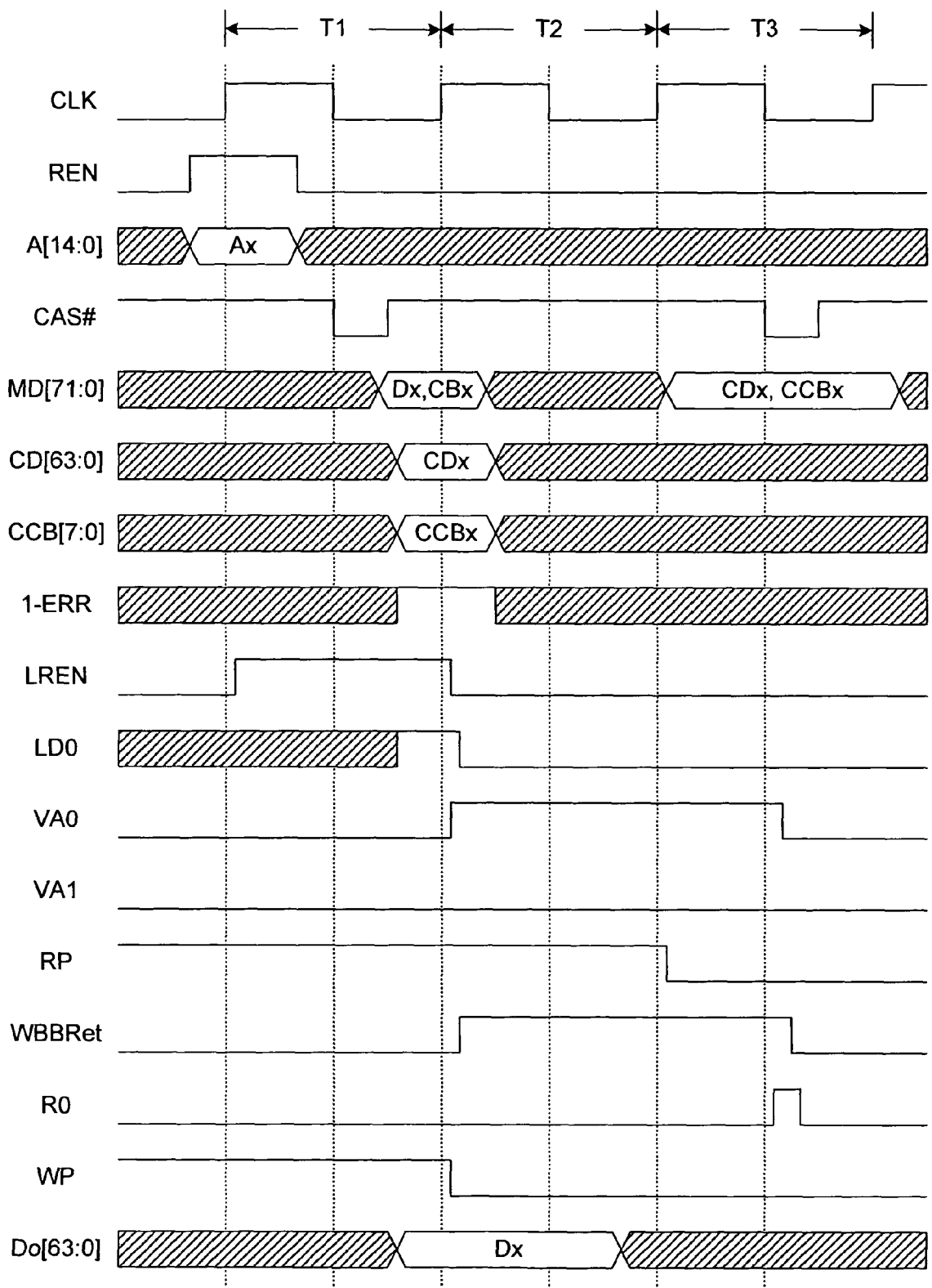
FIG. 5 is a waveform diagram illustrating the timing of a read transaction followed by a write-back operation in accordance with one embodiment of the present invention.

FIG. 5 is a waveform diagram illustrating the timing of a read transaction followed by a write-back operation in accordance with one embodiment of the present invention. Before the rising edge of clock cycle T1, the read enable signal REN is asserted high and a read address Ax[14:0] is provided on address bus A[14:0] to initiate a read access. At the rising edge of cycle T1, the read address Ax[14:0] is latched into address register 103 as the latched read address LAx[14:0]. This latched read address LAx[14:0] is driven to the memory address bus MA[14:0] through multiplexer 104. Multiplexer 104 routes the latched read access address LAx[14:0] in response to the high state of read enable signal REN and the low state of the write enable signal WEN.

The logic high read enable signal REN is also latched into memory array sequencer 102 in response to the rising edge of cycle T1. In response, memory array sequencer 102 sequentially activates the memory array control signals RAS#, SEN#, CASE, and PRC#, thereby reading the Hamming code word (i.e., MDx[71:0]) associated with the latched read address LAx[14:0]. Note that the only memory array control signal shown in FIG. 5 is the CAS# signal. The high state of the latched read enable signal REN in memory array sequencer 102 causes the memory write signal MWrite have a logic low value, thereby indicating that the present memory operation is a read access. Consequently, the accessed word MDx[71:0] is read out from the memory array on data bus MD[71:0].

The 72-bit accessed word MDx[71:0] is provided to error detection-correction unit 106, wherein the data portion of the word (i.e., MDx[63:0]) and the check-bit portion of the word (i.e., MDx[71:64]) are separated for syndrome generation, error detection and correction. If a single-bit error is detected, syndrome generator 112 activates the single-error signal (1-ERR) high, and error correction unit 113 corrects the single-bit error in either the data word or the check-bits. The corrected data word CDx[63:0] is driven through output driver 108 as the output data value Do[63:0].

Within write-back buffer 107, flip-flop 310 latches the logic high read enable signal REN at the rising edge of cycle T1, thereby providing a logic high latched read enable signal LREN. When the single error signal 1-ERR is activated high by syndrome generator 112, AND gate 321 activates the write buffer enable signal WBEN to a logic high state. AND gate 322 activates the load data signal LD0 to a logic high value in response to the logic high WBEN signal and the logic low write pointer value WP. At the beginning of clock cycle T2, the CLK signal transitions to a logic high state, thereby activating register 300, such that the logic high LD0 signal, the corrected check bits CCBx[7:0], the corrected data word CDx[63:0] and the associated latched address LAx[14:0] are written to register 300 of write-back buffer 107. At the this time, the valid bit $VA_0$ transitions to a logic high state, and the corrected ECC code word, consisting of corrected check bits CCBx[7:0] and the corrected data word CDx[63:0], is available at the output of register 300.

At the beginning of cycle T2, both the read enable signal REN and the write enable signal WEN are low, thereby indicating the absence of an external access. However, the valid signal $VA_0$ goes high after the rising edge of clock cycle T2. As a result, WBBRet signal has a low state at the rising edge of cycle T2. Thus, even though no external access is requested during cycle T2, write-back does not take place during cycle T2.

At the beginning of cycle T3, the high state of the WBBRet signal toggles the output of toggle flip-flop 313 (i.e., read pointer value RP) from high to low. The low state of the read pointer signal RP causes multiplexers 341-343 to route the corresponding contents of register 300. As a result, the latched address value LAx[14:0] stored in register 300 is driven as the write-back buffer tag address WBBTagx[14:0]. The WBBTagx[14:0] signal is provided to multiplexer 104. Multiplexer 104 routes the WBBTagx[14:0] signal as the memory address signal MA[14:0] in response to the logic low states of the REN and WEN signals. Multiplexers 341 and 342 route the corrected check bit value CCBx[7:0] and the corrected data word CDx[63:0] to tri-state buffers 351 and 352, respectively. The output enable signal OE is asserted high when the high state of the WBBRet signal is latched into flip-flop 311 at the rising edge of cycle T3. The high OE signal enables tri-state buffers 341 and 342 to drive the corrected check bit value CCBx[7:0] and the corrected data word CDx[63:0] onto memory data bus MD[71:0].

Memory array sequencer 102 latches the logic high WBBRet signal at the rising edge of cycle T3, thereby resulting in the sequential activation of the memory control signals RAS#, SEN#, CAS# and PRC#. Memory array sequencer 102 also asserts the MWrite signal in response to the logic high WBBRet signal. As a result, the word on data bus MD[71:0] is written to the memory location specified by the address WBBTag[14:0]. At the falling edge of the CLK signal in cycle T3, AND gate 324 provides a logic high output signal, thereby driving the reset signal R0 to a logic high state. The logic high reset signal R0 resets the valid bit $VA_0$ to a logic low value. The logic low valid bits $VA_0$ and $VA_1$ cause OR gate 333 to provide a logic "0" output signal, which in turn, causes the WBBRet signal to transition to a logic "0" state. At the end of CLK cycle T3, the control signals RAS#, SEN#, CAS# and PRC# are de-asserted high, thereby completing the memory write operation and write-back cycle.

Notice that if a single-bit error does not occur in the read access of cycle T1, then neither the data nor the check bits read from memory array 101 will be corrected or stored in write-back buffer 107. However, the uncorrected data is still driven out to the output data bus Do[63:0] by output driver 108.

Back-to-Back Read Cycles and Write-Back Cycles

Figure 6:
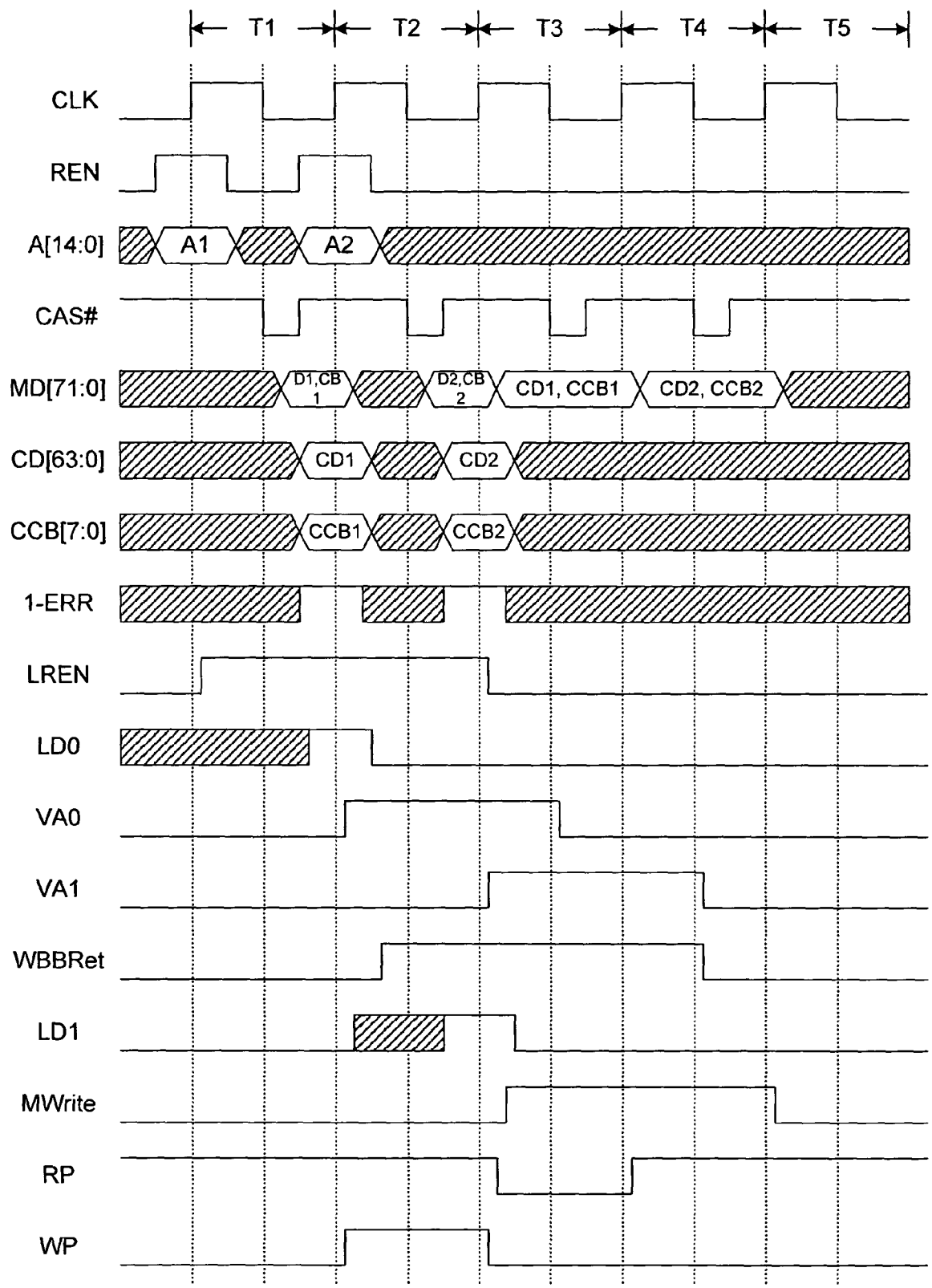
FIG. 6 is a waveform diagram illustrating the timing of two consecutive read access cycles followed by two consecutive write-back cycles in accordance with one embodiment of the present invention.

FIG. 6 is a waveform diagram illustrating the timing of two consecutive read access cycles followed by two consecutive write-back cycles in accordance with one embodiment of the present invention. Before the rising edge of clock cycle T1, the read enable signal REN is asserted high and a read address A1[14:0] is provided on address bus A[14:0] to initiate a read access. The read cycle operations and the control timing waveforms are similar to those shown in FIG. 5. A single-bit error is detected in this first read access, which results in the corrected Hamming code word (CD1/CCB1) and address A1[14:0] being stored in register 300 of write-back buffer 107. At the rising edge of cycle T2, the high state of the 1-ERR and LREN signals causes toggle flip-flop 312 to change the write pointer value WP from a logic "0" value to a logic "1" value, thereby configuring register 301 of write-back buffer 107 to receive the next corrected Hamming code word and address.

Before the rising edge of clock cycle T2, another read enable signal REN is asserted high and a second read address A2[14:0] is provided on address bus A[14:0] to initiate a second read access. Again, the read cycle operations and the control timing waveforms are similar to those shown in FIG. 5. A single-bit error is detected in this second read access. In response, error detection-correction correction circuit 106 asserts the 1-ERR signal and provides a corrected Hamming code word that includes corrected data CD[63:0] and corrected check bit CCB2[7:0]. In response to the logic high 1-ERR signal, the logic high LREN signal, and the logic high output of NAND gate 327, AND gate 321 provides a logic high write buffer enable signal WBEN. In response to the logic high WBEN signal and the logic "1" write pointer value, AND gate 323 asserts the load signal LD1 to a logic high value, thereby enabling register 301. On the rising edge of cycle T3, the corrected Hamming code word (CD2/CCB2), address A2[14:0] and the high state of LD1 are latched into register 301 of write-back buffer 107. Consequently, valid bit $VA_1$ is driven to a logic high value.

At the end of cycle T2, the low states of the REN and WEN signals indicate the absence of an external memory access. The low states of the REN and WEN signals, along with the high state of the $VA_0$ signal causes AND gate 326 to assert a logic high WBBRet signal. In write-back buffer 107, this high WBBRet signal is latched into flip-flop 311 at the rising edge of cycle T3, thereby causing output enable signal OE to go high. The high state of the WBBRet signal at the rising clock-edge also causes toggle flip-flop 313 to drive the read pointer value RP to a logic "0" state. Consequently, first address A1[14:0] stored in register 300 is driven as the output signal WBBTag[14:0], while the corrected data and check bits CD1[63:0] and CCB1[7:0] stored in register 300 are driven as output signal MD[71:0]. The write-back buffer tag WBBTag[14:0] is provided to memory array 101 through multiplexer 104 in response to the logic low REN and WEN signals. In memory array sequencer 102, the high state of the WBBRet signal is latched at the beginning of cycle T3. Subsequently, the MWrite signal is driven high and the memory array control signals RAS#, SEN#, CAS# and PRC# are activated in sequence so that memory array 101 goes through a memory write cycle with the corrected code word MD[71:0] written to the location specified by WBBTag[14:0]. The reset signal R0 goes high in response to the falling edge of cycle T3, thereby resetting the valid bit $VA_0$ in register 300. Resetting valid bit $VA_0$ invalidates the contents of register 300. At the end of cycle T3, the memory array control signals are all deactivated high and memory array 101 is ready for another access.

At the end of cycle T3, the low states of the REN and WEN signals again indicate the absence of an external memory access. The low states of the REN and WEN signals, together with the high state of valid bit $VA_1$ causes the WBBRet signal to remain in a logic high state. At the beginning of cycle T4, the high state of the WBBRet signal causes the read pointer value RP provided by toggle flip-flop 313 to transition to a logic high state. As a result, multiplexers 341-343 are controlled to route the corrected check bit CCB2[7:0] and the corrected data value CD2[63:0] as the MD[71:0] value, and the address value A2[14:0] as the write back buffer tag value WBBTag[14:0]. Note that the output enable signal OE remains in a logic high state in response to the logic high WBBRet signal. In memory array sequencer 102, the high state of the WBBRet signal is latched at the rising edge of cycle T4. The high state of the WBBRet signal causes the MWrite signal to remain high, thereby starting another write cycle in memory array 101. The write cycle is performed with the successive activation of the RAS#, SEN#, CAS# and PRC# signals. This results in the modified Hamming code word MD[71:0] from register 301 being written back to memory array 101 at the location (A2) specified by the WBBTag[14:0] read from register 301. The reset signal R1 goes high in response to the falling edge of cycle T4, thereby resetting the valid bit $VA_1$ in register 301. Resetting valid bit $VA_1$ invalidates the contents of register 301. At the end of cycle T4, the memory array control signals are all deactivated high and memory array 101 is ready for another access. When the valid bit $VA_1$ transitions to a logic low state, both of valid bits $VA_0$ and $VA_1$ have logic low values. As a result, OR gate 332 provides a logic low output signal, which causes the WBBRet signal to transition to a logic low state. The logic low valid bits VA0 and VA1 indicate that both entries of write-back buffer 107 have been retired to memory array 101.

Note that if another read access occurs during cycle T3 with a single-bit error on the accessed code word, then the corrected code word will not be written in the write-back buffer, because both of the valid bits $VA_0$ and $VA_1$ are high. The high valid bits $VA_0$ and $VA_1$ cause the output of NAND gate 327 to go low, and the output of AND gate (i.e., write-back enable signal WBEN) to go low. The low state of the WBEN signal prevents the load signals LD0 and LD1 from being asserted, and thereby prohibits writing new entries to registers 300 and 301. Rather, the entries in registers 300 and 301 are preserved for subsequent write-back operations. The corrected code resulted from this third read access is not written back to the memory array 101. However, this does not result in memory failure as long as the memory word does not accumulate another error bit, because this code word can still be read and corrected during a subsequent read access.

Alternate Embodiment

Figure 7:
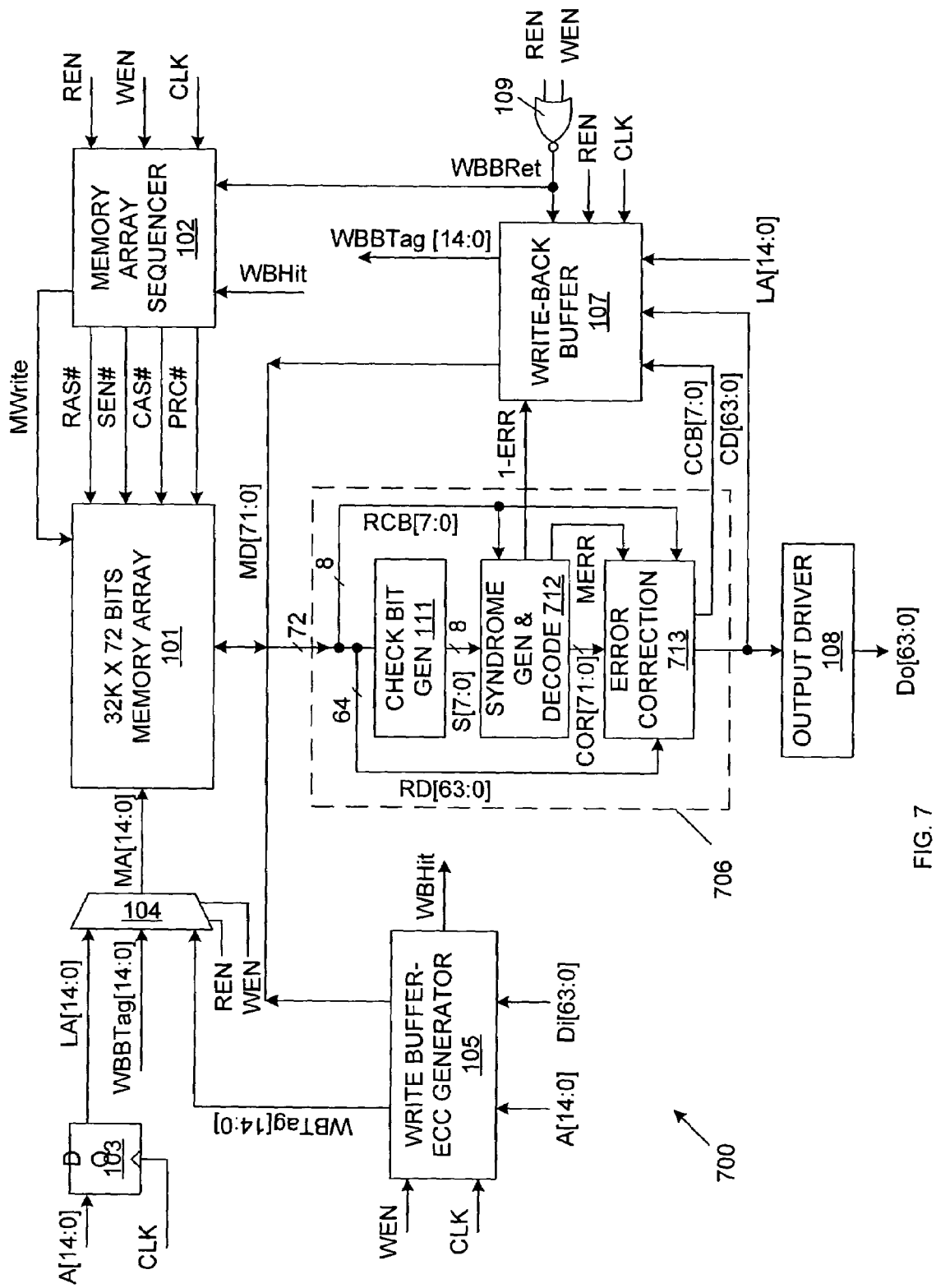
FIG. 7 is a block diagram of a memory device in accordance with an alternate embodiment of the present invention.

FIG. 7 is a block diagram of a memory device 700 in accordance with an alternate embodiment of the present invention. Because memory device 700 is similar to memory device 100 (FIG. 1), similar elements in FIGS. 1 and 7 are labeled with similar reference numbers. Thus, memory device 700 includes memory array 101, memory array sequencer 102, address register 103, multiplexer 104, write buffer/ECC generator 105, write-back buffer 107, output driver 108 and NOR gate 109, which have been described above. However, memory device 700 replaces error detection/correction circuit 106 with a modified error detection/correction circuit 706. Error detection/correction circuit 706 includes check bit generator 111 (which is described above), syndrome generator and decoder 712, and error correction unit 713. In a preferred embodiment, error detection/correction unit 706 is implemented using combinational logic. The external interface of memory device 700 is identical to the external interface of memory device 100 (i.e., there is no direct access to the ECC check bits via the external interface).

Single-error correction and double-error detection (SEC-DEC) is used both to improve soft-error immunity and self-repaired column redundancy. SEC-DEC also provides faster multiple error detection compared with other ECC codes having the same number of ECC check bits. In the present embodiment, the odd-weight Hamming code discussed in "A class of Optimal Minimum Odd-weighted-column SEC-DEC Codes," by M. Y. Hsiao in IBM Journal of Research and Development, pp. 395-401, July 1970 is used to generate the 8-bit ECC codes in response to the 64-bit data words. Other modified Hamming Code such as the one described in "16-bit CMOS Error Detection And Correction Unit", Integrated Device Technology, Inc. Data Book, April 1990, Section 5.10, pp. 1-19 can also be used. The requirements for the selected code are described in more detail below.

Figure 8:
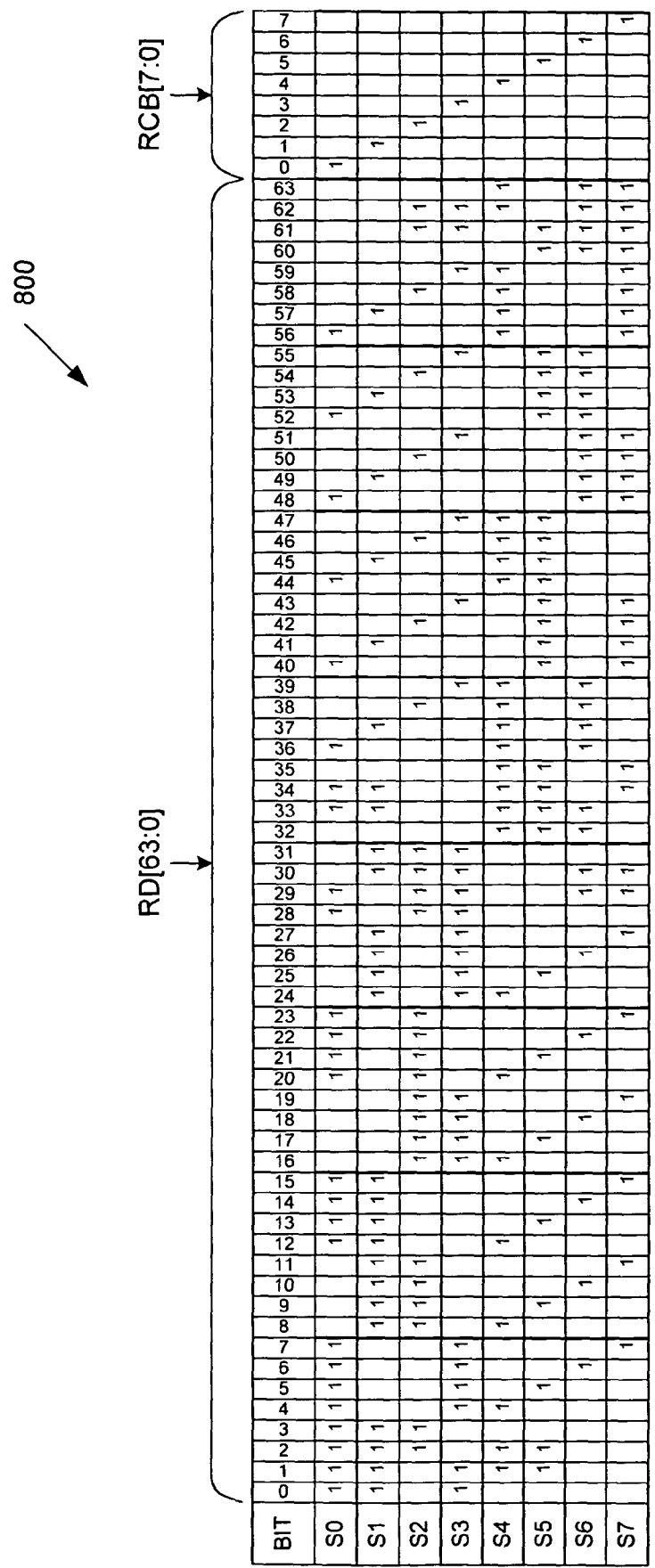
FIG. 8 is a parity-check matrix of an odd-weight Hamming code used with the memory device of FIG. 7 in accordance with one embodiment of the present invention.

FIG. 8 illustrates a parity-check matrix 800 of the odd-weight Hamming code used in the present embodiment. Columns 0 to 63 of parity-check matrix 800 show the ECC code for the corresponding bits of the data word RD[63:0]. Rows 0 to 7 shows the parity generation of the corresponding ECC check bits S[7:0].

For example, check bit S[0] is generated by performing an exclusive OR operation on the indicated bits RD[0:7], RD[12:15], RD[20:23], RD[28:29], RD[33:34], RD[36], RD[40], RD[44], RD[48], RD[52], and RD[56] of the data word RD[63:0]. If an odd number of the indicated bits have a logic "1" value, then check bit S[0] will have a logic "1" value. Conversely if an even number of the indicated bits have a logic "1" value, then check bit S[0] will have a logic "0" value. Check bits S[1:7] are generated in a similar manner.

Error Detection-Correction

The construct of the error detection/correction unit 706 is similar to error detection-correction unit 106. The only difference is in the ECC table used for the generation of the check bits.

Check bit generator 111 generates check bits S[7:0] in response to the read data values RD[63:0] in accordance with parity check matrix 800. The check bits S[7:0] are then passed to syndrome generator and decoder 712. Syndrome generator and decoder 712 performs a bit-wise comparison between check bits S[7:0] and the read check bits RCB[7:0], wherein each of the check bits S[7:0] is exclusive OR'ed with a corresponding one of the read check bits RCB[7:0], as illustrated in the last 8 columns of parity-matrix 800. The resultant syndrome 8-bit word is decoded to identify whether the 72-bit code read from the memory array is free of error, contains a single-bit error, or contains multiple-bit errors.

In the case of a single-bit error, syndrome generator and decoder 712 generates a 72-bit correction signal COR[71:0], which identifies the location of the error bit in response to 8-bit syndrome word, and activates the single-bit error signal 1-ERR. More specifically, syndrome generator and decoder 712 generates a correction signal COR[71:0] having a logic "1" value at the bit position associated with the error bit, and logic "0" values at all other bit positions. The correction signal COR[71:0] is provided to error correction unit 713, which corrects the single error bit in either the data word or the check bit in the manner described below. The error correction unit 713 can change, at most, one bit in the data word RD[63:0] or the read check bits RCB[7:0]. The corrected data word CD[63:0] and the corrected check bits CCB[7:0] and the associated location are written to write-back buffer 107 in the manner described above.

In the case where no error is detected, syndrome generator and decoder 712 generates a 72-bit correction signal COR[71:0], which indicates that there are no error bits. More specifically, syndrome generator 712 generates a correction signal COR[71:0] having all logic "0" values. Syndrome generator and decoder 712 also de-activates the 1-ERR signal and the MERR signal, which is described below. As described in more detail below, the data word RD[63:0] and the read check bits RCB[7:0] are not modified in this case.

In the case of a multiple bit error, syndrome generator and decoder 712 generates a non-zero syndrome which causes the correction unit to modify one of the bits in either the data word RD[63:0] or the read check bits RCB[7:0]. Syndrome generator and decoder 712 also activates a multiple error signal MERR, which is provided to error correction unit 713. As described in more detail below, when the MERR signal is activated, error correction unit 713 causes all bits of the read data word RD[63:0] to be inverted. As a result, error correction unit 713 provides a data word CD[63:0] that is the complement of the read data word RD[63:0]. Output driver 108 drives this data word CD[63:0] as the output data signal Do[63:0]. This data word CD[63:0] is subsequently recognized as an erroneous data value by the accessing BIST or test equipment, as described in more detail below.

In an alternate embodiment, the multiple error signal MERR is grounded (or not included). In this embodiment, error correction unit 713 is not used to invert the read data word RD[63:0] in the event of a multiple-bit error. Rather, the test data patterns written to memory array 101 are selected to ensure that all multiple-bit errors cause one or more error bits to appear in the output data signal Do[63:0]. This embodiment may require more test data patterns than the embodiment which error correction unit 713 inverts the read data value RD[63:0].

Figure 9:
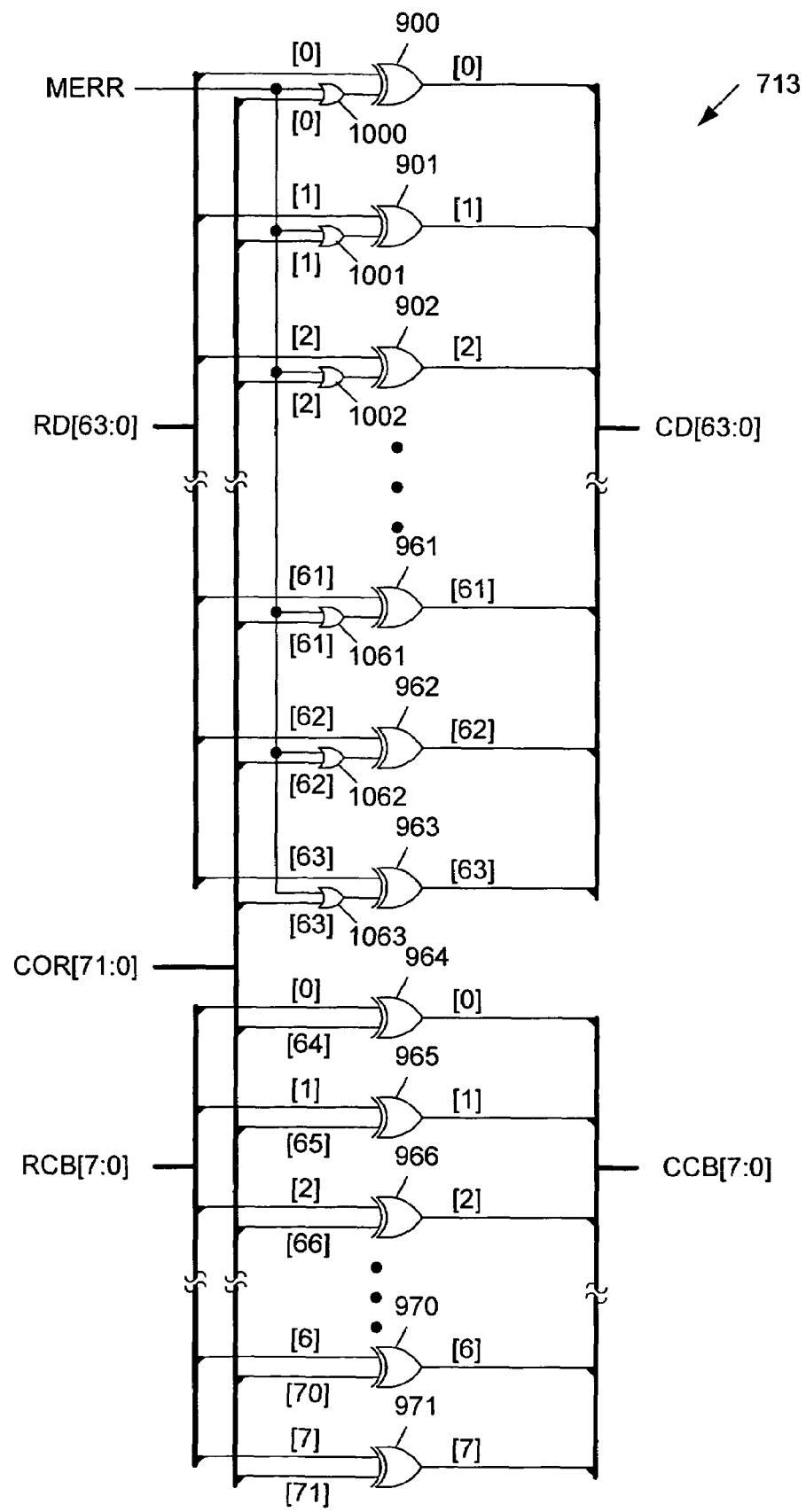
FIG. 9 is a schematic diagram of an error correction unit within the memory device of FIG. 7 in accordance with one embodiment of the present invention.

FIG. 9 is a schematic diagram of error correction unit 713 in accordance with one embodiment of the present invention. Error correction unit 713 includes exclusive OR gates 900-971, and OR gates 1000-1063. The MERR signal is applied to an input terminal of each of OR gates 1000-1063. The other input terminals of OR gates 1000-1063 are configured to receive the correction signals COR[0:63], respectively. The output terminals of OR gates 1000-1063 are coupled to input terminals of exclusive OR gates 900-963, respectively. The other input terminals of exclusive OR gates 900-963 are coupled to receive the read data bits RD[0:63], respectively. The output terminals of exclusive OR gates 900-963 provide the corrected data bits CD[0:63], respectively.

The RCB[0:7] bits are applied to input terminals of exclusive OR gates 964-971, respectively. The other input terminals of exclusive OR gates 964-971 are coupled to receive the correction signal bits COR[64:71], respectively. The output terminals of exclusive OR gates 964-971 provide the corrected check bits CCB[0:7], respectively.

Error Correction Unit 713 is divided into 2 sections, a data section (which includes exclusive OR gates 900-963 and OR gates 1000-1063) and a check bit section (which includes exclusive OR gates 964-971). When no errors exist, syndrome generator and decoder 712 provides a correction signal COR[71:0] having all logic "0" bits, a 1-ERR signal having a logic "0" state, and a MERR signal having a logic "0" state. Under these conditions, OR gates 1000-1063 provide logic "0" output signals. As a result, exclusive OR gates 900-963 pass the read data value RD[63:0] to the output bus CD[63:0] without any alteration. Similarly, exclusive OR gates 964-971 pass the read check bits RCB[7:0] to the corrected check bit bus CCB[7:0] without any alteration.

When a single-bit error exists, syndrome generator and decoder 712 provides a correction signal COR[71:0] having one logic "1" bit (at a location corresponding to the single-bit error) and the remaining bits all logic "0" bits, a 1-ERR signal having a logic "1" state, and a MERR signal having a logic "0" state. If the logic "1" bit in the COR[71:0] signal is located at one of the bit locations [63:0], then the corresponding OR gate 1000-1063 provides a logic "1" output signal. As a result, the associated exclusive OR gate inverts the applied read data bit, thereby correcting this bit. For example, if COR[2] has a logic "1" value, then OR gate 1002 provides a logic "1" value to associated exclusive OR gate 902. As a result, exclusive OR gate 902 provides an output signal CD[2] that is the inverse of the input signal RD[2]. The remaining bits RD[71:3], RD[1:0] and RCB[7:0] are not modified.

If the logic "1" bit in the COR[71:0] signal is located at one of the bit locations [64:71], then the corresponding exclusive OR gate 964-971 inverts the applied read check bit, thereby correcting this bit. For example, if COR[66] has a logic "1" value, then the associated exclusive OR gate 966 provides a corrected check bit CCB[2] that is the inverse of the read check bit RCB[2]. The remaining bits RD[71:0], RCB[7:3] and RCB[1:0] are not modified.

When a multiple-bit error exists, syndrome generator and decoder 712 provides a MERR signal having a logic "1" state. The logic "1" MERR signal causes each of OR gates 1000-1063 to provide a logic "1" output signal, irrespective of the state of the COR[71:0] signal. As a result, exclusive OR gates 900-963 invert all of the applied read data bits RD[63:0]. This ensures that at least one of the data bits in the resulting data word CD[63:0] is different from the original data written. In an alternate embodiment, error correction unit 713 can invert one or more of the applied read data bits RD[63:0] to ensure that at least one of the data bits in the resulting data word CD[63:0] is different from the original data written. The data word CD[63:0] is driven as the output data word Do[63:0]. The read check bits in RCB[7:0] may be toggled by any corresponding bits in COR[71:63] which have a logic "1" value.

Note that error correction unit 713 inverts all of the read data bits RD[63:0] to prevent the multiple-bit error from being aliased into the single-bit error space. As a result, the multiple-bit error can be detected by the on-chip BIST or the external testing equipment by monitoring the output data Do[63:0].

In the present embodiment, in order to make the error detection faster, syndrome generator and decoder 712 sets the MERR signal to a logic "1" state when the 8-bits of the generated syndrome word (i.e., the exclusive OR of check bits S[7:0] and read check bits RCB[7:0]) are not all zero, and the number of syndrome bits in the logic "1" state is even. Note that when using an odd-weighted column ECC, there will only be an even number of logic "1" values in the 8-bit syndrome word when an even number of error bits exist. Therefore, only an even number of multi-bit errors will cause the MERR signal to go high. Thus, all 2-bit errors (and 4-bit errors, 6-bit errors, etc.) will cause the MERR signal to be activated high. Although 3-bit errors do not cause the MERR signal to be activated high, the probability of three errors being aliased into the single-bit error space (and thereby going undetected) is very small. Thus, at least two of the three errors are propagated through error correction unit 713, and are subsequently detected. Note that the probability that a larger number of odd-bit errors (e.g., 5, 7, 9 bit errors) are aliased into the single bit error space is even lower. However, to ensure that all multi-bit stuck-at faults are detected during testing, simulation is used to verify that the set of test data patterns provides full coverage. (See, FIG. 11)

In an alternate embodiment, the multiple error signal MERR is not used (e.g., MERR is grounded or eliminated). In this embodiment, error correction unit 713 does not invert all of the bits of the read data word RD[63:0] in the event of a multiple-bit error. Rather, the test data patterns are selected to ensure that all multiple-bit errors cause one or more error bits to appear in the output data signal Do[63:0]. There are three different instances of a multiple-bit error, which are discussed below.

In the case where a multiple-bit error occurs in the read data word RD[63:0], error correction unit 713 can correct, at most, one of these bit errors. As a result, at least one error bit in the read data word RD[63:0] is passed to the output data word Do[63:0], uncorrected.

In the case where a multiple-bit error occurs in the read check bits RCB[7:0], syndrome generator and decoder 712 will cause error correction unit 713 to make an erroneous correction to one of the bits in the data word RD[63:0]. As a result, at least one error bit is introduced to the output data word Do[63:0].

In the case where error bits occur in both the data word RD[63:0] and the read check bits RCB[7:0], an error bit in the data word RD[63:0] will be passed without alteration, or the correction signal COR[71:0] will cause error correction unit 712 to make an erroneous correction to one of the bits in the data word RD[63:0]. As a result, at least one error bit is introduced to the output data word Do[63:0].

Note that a simulation must be performed to verify that all possible multiple-bit errors can be excited and detected in response to the selected set of test data patterns. That is, the set of test data patterns must be selected to ensure that fault coverage is provided for 100% of multiple-bit faults, by ensuring that at least one error bit is present in the output data value Do[63:0] when a multiple-bit fault exists. The error bit present in the output data value Do[63:0] is detected by the BIST or the automated test equipment.

In a particular embodiment, the multiple-bit error signal MERR is activated when a multiple-bit error is detected in the RCB[7:0] value. As a result, error correction unit 713 inverts the read data value RD[63:0], thereby mis-correcting one or more of the read data bits RD[63:0]. This advantageously allows multi-bit faults in the RCB[7:0] value to be translated to the output data value Do[63:0].

Test Pattern and Fault Coverage

Memory testing usually involves writing of certain data patterns into the various memory locations and then reading the data back to see if the data pattern read from the memory matches the data pattern written to the memory. If a mismatch occurs, a fault is detected. Therefore, the testing procedure consists of two parts: the data or bit patterns of the word written to every memory location, and the algorithm or sequence of writing and reading the data pattern to and from the different memory locations. Common memory faults include stuck-at faults in memory cells, stuck-at faults in address decoding, pattern-dependent faults in memory cells, and stuck-at faults in the read and write data-path logic. Stuck-at faults happen when defects occur in the associated circuits so that the outputs stay in one state all the time. A pattern-dependent fault in a memory cell occurs when the state of the memory cell is affected by the states of the neighboring cells. A marching algorithm with a solid pattern, such as all zeroes and all ones has been proven effective and is commonly employed in detecting these common memory faults. A solid data pattern is a word having a certain value, for example a word with all of the data bits equal to "0" or "1", which is used to write to all memory locations. Testing is typically carried out using a solid data pattern, followed by a complementary data pattern. For example, a data pattern of all ones can be written and read, and then a complementary data pattern of all zeros can be written and read.

A conventional marching test using all zeros and all ones is carried out as follows. Consecutive address locations are written with the all zero pattern until all of the memory locations are written. Starting with address location "0", the all zero pattern is read from the memory. If the data is correctly read as an all zero pattern, then an all one pattern is written back to the same location. The read and write operation is called a read-modify-write operation. This read-modify write operation is repeated on consecutive address locations throughout the memory address space.

Starting again with address location "0", the all one pattern is read from the memory. If the data is correctly read as an all one pattern, then an all zero pattern is written back to the same location. This read-modify-write operation is repeated on consecutive addresses until the maximum address location is reached.

Starting again with address location "0", the all zero pattern is read from the memory and checked. This read process is repeated until the location with the maximum address value is reached. During the test, a fault is detected when an incorrect data value is read from the memory. Thus, conventional memory testing uses a minimum number of test data patterns (i.e., two test data patterns in the above-described example).

The goal of memory testing is to detect all faults in the memory using a minimum number of data patterns and algorithms. For a memory without ECC, the read data output from the memory provides full observability of all the memory faults. Traditional memory with ECC provides inputs and outputs so the ECC memory can be tested directly through the ECC input-output bus. This allows the memory to be tested without additional test data patterns or algorithms, but at the expense of adding the extra ECC input-output bus. To make the memory interface of the present embodiment the same as that of a memory without ECC, the ECC input and output to the memory is not provided (See, FIGS. 2 and 7). Since the ECC word is not directly controllable and observable, indirect controllability and observability is provided in accordance with the present invention. As described in more detail below, this indirect controllability and observability is obtained through the selected ECC code (FIG. 8), the selected test data patterns provided on input data bus Di[63:0], and the resulting test data patterns read on output data bus Do[63:0].

The operation of ECC detection/correction circuit 706 further complicates the fault detection, as this circuit 706 corrects all single-bit faults in the manner described above. Therefore, to detect a 2-bit stuck-at fault, the test data pattern must be constructed such that both fault bits are exposed simultaneously. Otherwise, the fault is not detected. For example, a two bit stuck-at fault at bit locations [0] and [1] of a data word at a logic high state (H) and a logic low state (L), respectively, cannot be detected by the all zero pattern or the all one pattern. For example, for the all one pattern, the stuck-at high state of bit [0] is not detectable, and the stuck-at low state of bit [1] is treated as a single-bit error that is corrected by error detection/correction circuit 706. As a result, the two-bit fault is not observable if the testing only uses the all zero pattern and the all one pattern.

In general, stuck-at faults in two data bits can occur with four different combinations: LL, LH, HL, and HH. Four data patterns (00, 01, 10 and 11) are required to cover all four combinations of faults. To cover all 2-bit errors in memory array 101 would require 64×64 or 4,096 test data patterns.

To test memory array 101 using this many data patterns is not practical as the test time would be too long. To cover three or more bits with stuck-at faults would require an even larger number of test vectors. However, any three or more bit faults are a combination of one or more 2-bit faults plus one (or no) single-bit fault. Therefore, by detecting all the 2-bit faults, any 3 or more bit faults are detected with the same test data patterns.

In accordance with the described embodiment, to cover the 2-bit faults, a walking "1" pattern and a walking "0" pattern can be used. The walking "1" pattern consists of 64 patterns, each having only one bit in the logic "1" state and the rest of the bits in the logic "0" state. Each pattern is different from the other patterns in the bit position of the logic "1" bit. The first five 64-bit values of the walking "1" pattern are therefore: 0000000000000001H, 0000000000000002H, 0000000000000004H, 0000000000000008H, and 0000000000000010H. The walking "0" pattern is the inverse of the walking "1" pattern.

Because the ECC check bits stored in memory array 101 are not directly controllable, in order to detect the stuck-at faults on the ECC check bits, it is necessary to establish that the ECC check bits are controllable through the data bits. This controllability is established in the described embodiment by selecting an ECC matrix that has linearly independent columns. For example, the parity check matrix 800 of FIG. 8 (excluding the eight right-most check bit columns) has 8 linearly independent columns. Therefore, it is possible to transform the ECC matrix 800 into the controllability matrix 1100 shown in FIG. 10. This controllability matrix 1100 contains a unity matrix in the first 8 columns, and logic "0" values in all the other columns. For example, the controllability matrix 1100 of FIG. 10 can be established by performing exclusive OR operations as defined below by Table 1.

TABLE 1

| Check Bit | XOR OF COLUMNS |
|---|---|
| S0 | Di[0], Di[1], Di[44] |
| S1 | Di[0], Di[1], Di[45] |
| S2 | Di[0], Di[1], Di[46] |
| S3 | Di[0], Di[1], Di[47] |
| S4 | Di[0], Di[3], Di[16] |
| S5 | Di[0], Di[3], Di[17] |
| S6 | Di[0], Di[3], Di[18] |
| S7 | Di[0], Di[3], Di[19] |

Thus, in the first column of controllability matrix 1100, an exclusive OR operation is performed on the input data bits Di[0], Di[1] and Di[44]. When the input data bits Di[0], Di[1] and Di[44] all have logic "1" values, and the remaining input data bits Di[2:43] and Di[45:63] all have logic "0" values, check bit So has a logic "1" value, and check bits S1-S7 all have logic "0" values. The second through eighth columns of controllability matrix are similarly established in the manner defined by Table 1.

The controllability matrix 1100 of FIG. 10 shows that the states of the ECC check bits can be controlled by different test data patterns of the input data word Di[0:63]. That is, controllability matrix 1100 illustrates that all of the ECC check bits can be toggled in response to different test data patterns, thereby ensuring that stuck-at faults in these ECC check bits can be excited. The excitation of the multiple-bit faults in the ECC bits causes error correction unit 713 to make erroneous corrections in the output data word Do[63: 0], which are subsequently detected by the BIST or ATE.

The multiple-bit faults in the ECC bits are thus indirectly observed or detected.

Figure 11:
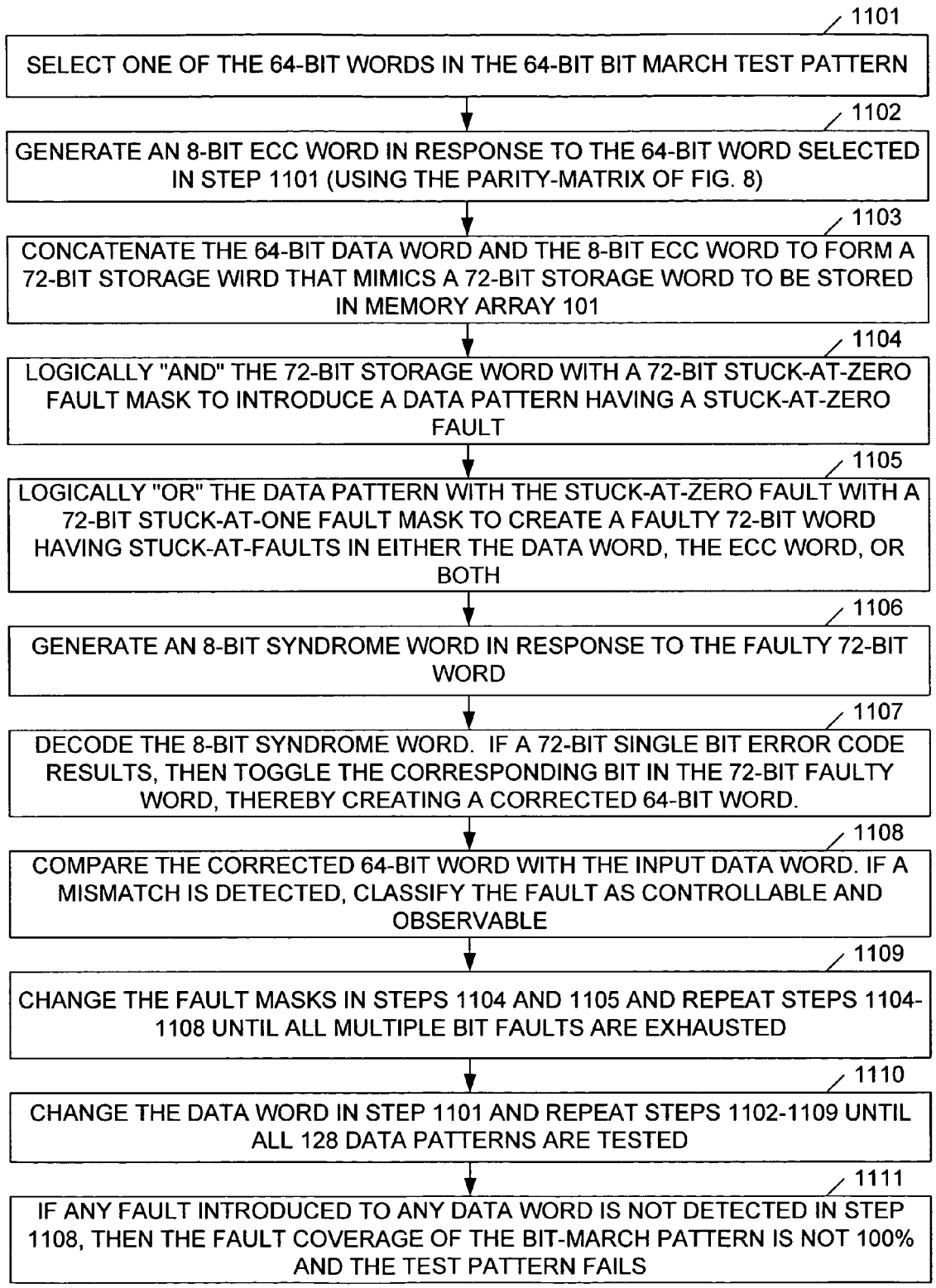
FIG. 11 is a block diagram of a simulation program that can be used to test the fault coverage of a bit-march test data pattern.
Figure 11:
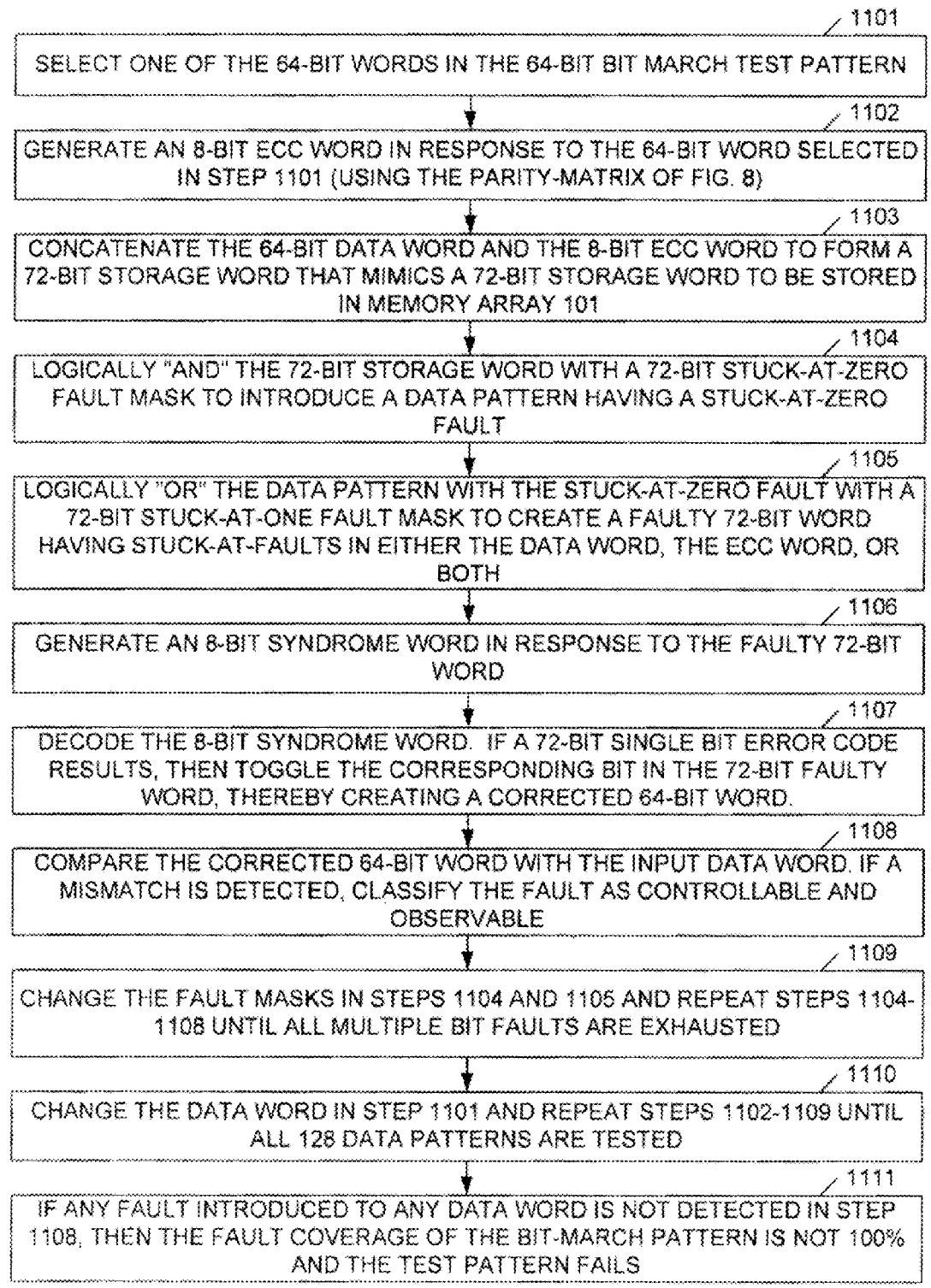

A computer simulation program is used to verify the fault-coverage of the test data patterns. Such a program can be readily written by a person having ordinary skill in the art of computer programming. FIG. 11 is a flow diagram that illustrates a basic simulation program, including steps 1101-1111, that can be used to test the fault coverage of a set of test data patterns.

Using this computer simulation, 100% stuck-at fault coverage with two or more bit errors can be obtained using the walking "1" pattern and a walking "0" pattern (which is the complement of the walking "1" pattern). Note that all of the check bits S[7:0] will be toggled in response to the walking "1" and walking "0" patterns. In this case, 128 data patterns are used to provide 100% fault coverage.

The simulation program of FIG. 11 may also be used to verify that a marching "1" pattern and a marching "0" pattern (described below) provide 100% fault-coverage for two or more bit errors. As mentioned above, a marching algorithm can be used to detect both stuck-at memory faults and pattern-dependent faults. Thus, a marching "1" pattern and a marching "0" pattern are used to test memory array 101 in accordance with one embodiment of the present invention.

A bit-march test using a marching "1" pattern followed by a marching "0" pattern is carried out as follows. First, consecutive address locations are written with the all "0" pattern until all of the memory locations in memory array 101 are written. Then, starting with address location "0", the all "0" pattern is read from memory array 101. If the data is read correctly, then the data pattern 0000000000000001H is written back to the same address location (i.e., address location "0"). In this manner, a logic "1" value is marched to bit location [0] of address location "0". The data pattern 0000000000000001H is then read from the same address location (i.e., address location "0"). If the data is read correctly, then the data pattern 0000000000000003H is written back to the same address location (i.e., address location "0"). In this manner, the logic "1" value is marched to bit locations [0] and [1] of address location "0". Additional read-modify-write operations are performed, thereby marching the logic "1" value to consecutively higher bit locations. This process is repeated until the word pattern stored at address location "0" becomes all logic "1" values, or FFFFFFFFFFFFFFFFH. The address location is then incremented (i.e., from address location "0" to address location "1"), and the above-described bit-march is repeated for the new address location. The read-modify-write operations are repeated for sequential address locations until all of the memory locations in memory array 101 have been tested.

Then, starting again with address location "0", the all "1" pattern is read from memory array 101. If the data is read correctly, then the data pattern FFFFFFFFFFFFFFFEH is written back to the same address location (i.e., address location "0"). In this manner, a logic "0" value is marched to bit location [0] of address location "0". The data pattern FFFFFFFFFFFFFFFEH is then read from the same address location (i.e., address location "0"). If the data is read correctly, then the data pattern FFFFFFFFFFFFFFFCH is written back to the same address location (i.e., address location "0"). In this manner, the logic "0" value is marched to bit locations [0] and [1] of address location "0". Additional read-modify-write operations are performed, thereby marching the logic "0" value to consecutively higher bit locations of address location "0". This process is repeated until the word pattern becomes all logic "0" values, or 0000000000000000H. The address location is then incremented (i.e., from address location "0" to address location "1"), and the above-described bit-march is repeated for the new address location. The read-modify-write operations are repeated for sequential address locations until all of the memory locations in memory array 101 have been tested.

If any data word Do[63:0] read from memory array 101 is incorrect during the above-described read-modify-write operations, then a multi-bit fault is detected. Note that 128 test data patterns are used in the described embodiment. Fewer numbers of test data patterns can be used in other embodiments. In an alternate embodiment, the number of test data patterns can be reduced by using partial data words having their own ECC check bits. For example, the 64-bit words can be subdivided into 16-bit partial data words, with each of the 16-bit partial data words having five associated ECC check bits. In this case, only 32 test data patterns would be required to perform the fault testing. However, storage would have to be provided for 20 ECC check bits per 64-bit word.

Although the invention has been described in connection with several embodiments, it is understood that this invention is not limited to the embodiments disclosed, but is capable of various modifications, which would be apparent to a person skilled in the art. Moreover, although the invention has been described in accordance with a memory array using DRAM cells and a marching test algorithm, the invention described herein can also be applied to a memory array constructed using SRAM cells or non-volatile memory cells with some modification in the memory array sequencer and other test data patterns which are readily accomplished by those having the common art in the memory design and testing. Thus, the invention is limited only by the following claims.

We claim:

1. A method of testing a semiconductor memory having transparent error correction, the method comprising:
providing a test data pattern to the semiconductor memory;
generating a corresponding error correction code (ECC) value in response to the test data pattern;
storing the test data pattern and the corresponding ECC value in a memory array;
reading the test data pattern and the corresponding ECC value from the memory array;
passing the test data pattern unmodified as an output data value if no errors exist in the test data pattern and the corresponding ECC value read from the memory array;
correcting a single-bit error in the combination of the test data pattern and the corresponding ECC value read from the memory array, if such a single-bit error exists, and passing the resulting test data pattern as an output data value; and
ensuring that an erroneous test data pattern having one or more error bits is provided if the combination of the test data pattern and the corresponding ECC value read from the memory array includes a multiple-bit error, and passing the erroneous test data pattern as an output data value, wherein the ECC values are not accessible from outside the semiconductor memory.

2. The method of claim 1, wherein the step of ensuring that an erroneous test data pattern having one or more error bits is provided if the combination of the test data pattern and the corresponding ECC value read from the memory array include a multiple-bit error comprises:

identifying a set of test data patterns that cause all potential multiple-bit faults in the memory array to be excitable; and selecting the test data pattern from the set of test data patterns.

3. The method of claim 1, wherein the step of ensuring that an erroneous test data pattern having one or more error bits is provided if the combination of the test data pattern and the corresponding ECC value read from the memory array include a multiple-bit error further comprises inverting one or more bits of the test data pattern read from the memory array.

4. The method of claim 1, wherein the ECC value is generated using an odd-weight Hamming code.

5. The method of claim 1, further comprising:

generating a set of check bits in response to the test data pattern read from the memory array; and comparing the set of check bits with the ECC value read from the memory array.

6. The method of claim 5, further comprising:

generating a syndrome word in response to step of comparing the set of check bits with the ECC value read from the memory array;

activating a single-bit error signal if the syndrome word indicates the presence of a single-bit error; and activating a multiple-bit error signal if the syndrome word indicates the presence of an even number of errors.

7. The method of claim 5, further comprising:

generating a syndrome word in response to step of comparing the set of check bits with the ECC value read from the memory array;

activating a single-bit error signal if the syndrome word indicates the presence of a single-bit error; and activating a multiple-bit error signal if the syndrome word indicates the presence of a multiple-bit error.

8. The method of claim 7, wherein the syndrome word indicates the location of a single-bit error in the combination of the test data pattern and the ECC value read from the memory array.

9. A method of testing a semiconductor memory having transparent error correction, the method comprising:

applying a plurality of test data patterns to the semiconductor memory, wherein the semiconductor memory internally generates corresponding error correction code (ECC) values in response to the test data patterns;

storing the plurality of test data patterns and corresponding ECC values in a memory array of the semiconductor memory;

retrieving the plurality of test data patterns and corresponding ECC values from the memory array;

providing the retrieved test data patterns unmodified as output data values when no errors exist in the retrieved test data patterns and corresponding ECC values;

correcting single-bit errors in the retrieved test data patterns if single-bit errors exist in the retrieved test data patterns, and providing the resulting test data patterns as output data values; and ensuring that an erroneous test data pattern having one or more error bits is provided if a multiple-bit error exists in the combination of a retrieved test data pattern and a corresponding ECC value, and passing the erroneous test data patterns as output data values, wherein the ECC values are not accessible from outside the semiconductor memory.

10. The method of claim 9, wherein the step of ensuring that an erroneous test data pattern having one or more error bits is provided comprises, inverting one or more bits of the retrieved test data pattern.

11. The method of claim 9, wherein each of the test data patterns has a width of N-bits, wherein N is an integer, and wherein the plurality of test patterns includes 2N or fewer test patterns.

12. The method of claim 9, wherein the ECC values are generated using an odd-weight Hamming code.

13. The method of claim 9, further comprising selecting the plurality of test data patterns to ensure that 100% of the multiple-bit errors in the memory array are detectable.

14. The method of claim 9, wherein the test data patterns comprise a marching "1" pattern and a marching "0" pattern.

15. The method of claim 9, wherein the test data patterns comprise a walking "1" pattern and a walking "0" pattern.

16. The method of claim 9, further comprising determining whether any combination of a retrieved test data pattern and a corresponding ECC value contain multiple-bit errors.

17. The method of claim 16, wherein the step of determining whether any combination of a retrieved test data pattern and a corresponding ECC value contain multiple-bit errors comprises determining whether any combination of a retrieved test data pattern and a corresponding ECC value contain an even number of bit errors.

18. A memory system comprising:

a semiconductor memory having a memory array, a memory interface and an error detection/correction unit, wherein the memory array is configured to store test data patterns and corresponding error correction code (ECC) values, the memory interface does not provide direct access to the ECC values, and the error detection/correction unit is configured to correct a single-bit error in any combination including a test data pattern and a corresponding ECC value; and a set of test data patterns associated with the semiconductor memory, wherein the set of test data patterns are selected such that any multiple-bit error in a combination including a test data pattern and a corresponding ECC value causes the error detection/correction unit to provide an output data pattern having an error, thereby rendering multiple-bit faults 100% detectable.

19. A semiconductor memory device having transparent error detection and correction, comprising:

an error correction code (ECC) generator configured to provide a corresponding ECC value in response to a test data pattern, wherein the ECC values are not accessible from outside the semiconductor memory device;

a memory array configured to store the test data pattern and the corresponding ECC value; and an error detection/correction circuit coupled to receive the test data pattern and the corresponding ECC value from the memory array, and in response, provide an output test data pattern, wherein the error detection/correction circuit is configured to provide the test data pattern as the output test data pattern if no errors exist in the combination of the test data pattern and the corresponding ECC value, to correct any single-bit error in the combination of the test data pattern and the corresponding ECC value, and to ensure that one or more error bits exist in the output test data pattern if a multiple-bit error exists in the combination of the test data pattern and the corresponding ECC value.

20. The semiconductor memory of claim 19, further comprising a plurality of test data patterns associated with the error detection/correction circuit, wherein all multiple-bit errors in the test data pattern and the corresponding ECC value are 100% controllable (excitable) and observable (detectable) via the test data patterns.

21. The semiconductor memory device of claim 19, wherein the error detection/correction circuit comprises:
 a check bit generator configured to generate a set of ECC check bits in response to the test data pattern;
 a syndrome generator/decoder configured to generate a syndrome in response to the set of ECC check bits and the corresponding ECC value, wherein the syndrome indicates the presence of no errors, the presence of a single-bit error, or the presence of a multiple-bit error in the combination of the test data pattern and the corresponding ECC value; and
 an error correction unit configured to pass the test data pattern unmodified if the syndrome indicates the presence of no errors, correct a single-bit error if the syndrome indicates the presence of a single-bit error, and invert one or more bits of the test data pattern if the syndrome indicates the presence of a multiple-bit error.

22. The semiconductor memory device of claim 21, wherein the syndrome generator/decoder is configured to indicate the presence of an even number of bit errors in the test data pattern and the corresponding ECC value.

\* \* \* \* \*

UNITED STATES PATENT AND TRADEMARK OFFICE
CERTIFICATE OF CORRECTION

PATENT NO. : 7,353,438 B2 Page 1 of 2
APPLICATION NO. : 10/645861
DATED : April 1, 2008
INVENTOR(S) : Wingyu Leung et al.

It is certified that error appears in the above-identified patent and that said Letters Patent is hereby corrected as shown below:

Title Page, FOREIGN PATENT DOCUMENTS, add -- GB 2289779  11/1995 --.

Drawings:

Delete drawing sheet 11 of 11 and substitute therefor the attached Drawing Sheet containing Fig. 11.

Column 1, line 30, amend "Semiconductors" to -- Semiconductor --.

Column 4, line 6, amend "stuck at" to -- stuck-at --.

Column 4, line 28, amend "stuck at" to -- stuck-at --.

Column 9, line 66, replace "1" with a comma.

Column 10, lines 27-28, delete "The logic high RESET signal also sets the read pointer value RP provided by toggle flip-flop 313 to a logic."

Column 12, line 66, insert -- 102 -- after "sequencer".

Column 13, line 11, amend "doe" to -- does --.

Column 13, line 38, insert -- to -- before "have".

Column 13, line 66, delete "the" (first occurrence).

Column 17, line 33, amend "I11" to -- 111 --.

Column 22, line 54, amend "So" to -- S0 --.

Signed and Sealed this

Second Day of December, 2008

JON W. DUDAS
*Director of the United States Patent and Trademark Office*